US007810067B2

(12) United States Patent
Kaelicke et al.

(10) Patent No.: US 7,810,067 B2
(45) Date of Patent: Oct. 5, 2010

(54) DEVELOPMENT PROCESSES REPRESENTATION AND MANAGEMENT

(75) Inventors: Elke Kaelicke, Wiesloch (DE); Nelson Ambruoso, Southampton, PA (US); Michael Bannert, Heidelberg (DE); Gary Bellis, West Chester, PA (US); Chirantan Vinayak Bhatt, Malvern, PA (US); Glenn Crowe, Wayne, PA (US); Christopher Farrell, Jamison, PA (US); Harald Fisher, Muehlhausen (DE); Gerhard Fried, Heidelberg (DE); Gertrud Giesche, Newtown Square, PA (US); Donna Gregory, Downingtown, PA (US); Volkmar Jaeckle, Glen Mills, PA (US); Harald Kehr, Sinsheim (DE); Marc Liesner, Hatboro, PA (US); Anette Lucks-Baus, Kirkel (DE); Andrea MacDonald, Pottstown, PA (US); Roman Mansmann, Tholey (DE); Phillip Mattox, Lansdowne, PA (US); Thomas Mueller, Blackwood, NJ (US); Nimish Patel, West Chester, PA (US); Michael Pezza, Rumford, RI (US); Dieter Pollinger, Rauenberg (DE); Theresa Rajczi, West Chester, PA (US); Richard Roberts, III, West Chester, PA (US); Andrea Roesinger, Weinheim (DE); Michael Santilli, Downington, PA (US); Andreas Schaefers, Gaiberg (DE); Harald Stuckert, West Chester, PA (US); Bernd Tesche, Sandhausen (DE); Dirk Wagener, Phoenixville, PA (US); Reinhard Wenig, Walldorf (DE); Juergen Zahn, Mannheim (DE); Kenneth Salwitz, Horsham, PA (US); Randolph Houck, Glen Mills, PA (US); Nadine Filbry, Philadelphia, PA (US); Fritz Leber, Kirchheimbolanden (DE)

(73) Assignee: SAP Aktiengesellschaft, Walldorf (DE)

( * ) Notice: Subject to any disclaimer, the term of this patent is extended or adjusted under 35 U.S.C. 154(b) by 1150 days.

(21) Appl. No.: 10/654,640

(22) Filed: Sep. 2, 2003

(65) Prior Publication Data

US 2004/0143811 A1 Jul. 22, 2004

Related U.S. Application Data

(60) Provisional application No. 60/443,278, filed on Jan. 27, 2003, provisional application No. 60/407,446, filed on Aug. 30, 2002.

(51) Int. Cl.
*G06F 9/44* (2006.01)
(52) U.S. Cl. .................. 717/102; 717/103; 717/121
(58) Field of Classification Search ................. 717/101
See application file for complete search history.

(56) References Cited

U.S. PATENT DOCUMENTS 6,233,732 B1 * 5/2001 Matsuyama et al. ......... 717/141
2003/0188290 A1 * 10/2003 Corral ........................ 717/101

OTHER PUBLICATIONS

"Trial-Use Standard; Standard for Information Technology; Software Life Cycle Processes Software Development; Acquirer-Supplier Agreement", J-STD-016-1995 Institute of Electrical and Electronic Engineers, Inc., and Electronic Industries Association, Sep. 30, 1995.
"Military Standard Software Development and Documentation", MIL-STD-498, Dec. 5, 1994.
IEEE/EIA 12207.0-1996; Industry Implementation of International Standard ISO/IEC 12207 : 1995; (ISO/IEC 12207) Standard for Information Technology—Software life cycle processes; Mar. 1998 (software development standards from The Institute of Electrical and Electronics Engineers, Inc. and Electronic Industries Assoc. Engineering Dept.).
ISO/IEC 12207, First edition Aug. 1, 1995 / Amendment 1 May 1, 2002; Information technology—Software life cycle processes, Amendment 1; Ref. No. ISO/IEC 12207:1995/Amd.1:2002(E) (software development standards from the International Organization for Standardization and the International Electrotechnical Commission).

Document entitled "SDLC Standards/Project Management/Project Management Approach," Version 1.1, Sep. 20, 2000, available at http://srmwww.gov.bc.ca/imb/3star/sdlc/8manage/3project/pmapproach.htm.

Document entitled "SDLC Standards/System Development Life Cycle (SDLC) Overview," Version 1.4, Apr. 22, 2002, available at http://srmwww.gov.bc.ca/imb/3star/sdlc/0overview/overview.htm.

Karlsson, E.-A. et al., "*Daily Build and Feature Development in Large Distributed Projects,*" Term Paper for SC207 by Leong Jern-Kuan S10, *Proceedings of the 22nd International Conference Software Engineering 2000, ICSC 2000*, p. 649-658, 2000, pp. 1-5.

Kessler, Karl, intelligentERP, "*Support for Modifications in the ABAP Workbench,*" [online], <http://www.intelligenterp.com/feature/archive/kessler.shtml>, retrieved Jun. 19, 2003, 10 pages.

Mohapatra, Saroj, Planetsap.com, "*Correction and Transport System,*" [online], <http://www.planetsap.com/cts.htm>, retrieved Jun. 19, 2003, 38 pages.

\* cited by examiner

*Primary Examiner*—Chameli C. Das
*Assistant Examiner*—Isaac T Tecklu
(74) *Attorney, Agent, or Firm*—Fish & Richardson P.C.

(57) ABSTRACT

Systems and techniques to manage and represent development processes. In general, in one implementation, the technique includes a method for managing a software development process. The method includes providing a cookbook describing tasks in a framework of the development process and managing performance of the development process with the cookbook. A first task description identifies an activity in the development process, an input for performance of the activity, an output consequential of performance of the activity, and instructions for performance of the activity. Managing performance of the development process with the cookbook includes assigning activities in the development process to different participants in accordance with the activities identified in the task descriptions, exchanging information between participants in accordance with the inputs and outputs identified in the task descriptions, and instructing the participants in accordance with the instructions identified in the task descriptions.

18 Claims, 26 Drawing Sheets

DEVELOPMENT AND TEST PHASE
(Specification Stage)

| TASK | OBJECTIVE(S) | INPUT | OUTPUT |
|---|---|---|---|
| Specification Creation | -Identify scope and requirements of development<br>-Specify end-user's requirements | -Preliminary analysis<br>-Proposed development result<br>-ARC sheet<br>-Risk analysis | -Unreviewed specification |
| Specification Review | -Validate completeness and accuracy of specification<br>-Identify open issues | -Unreviewed specification | -Reviewed specification |
| Intermediate Design | -Develop intermediate (component level) design of result<br>-Assess complexity, risk of intermediate design of result | -Reviewed specification | -Intermediate design of result<br>-Complexity, risk assessments |
| Prototype Creation | -Refine intermediate design of result | -Intermediate design of result | -Prototype<br>-Refined intermediate design of result |
| Design Review | -Validate intermediate design of result<br>-Describe result environment and constraints<br>-Assess complexity, risk, delivery of result | -Intermediate design of result<br>-Prototype | -Reviewed design of result |
| Test Strategy Definition | -Define test strategy, procedures, results<br>-Detail test activities, including test-related tasks, roles and responsibilities, staffing, scheduling, tools, and environment<br>-Identify phase requirements and initiate requirement management<br>-Create result standards plan<br>-Weigh specific test requirements | -Reviewed specification<br>-Reviewed design of result<br>-Development documentation | -Unreviewed test strategy<br>-Requirements matrix<br>-Test procedures, schedule<br>-Result standards plan |

| DEVELOPMENT AND TEST PHASE (Specification Stage) | | | |
|---|---|---|---|
| TASK | OBJECTIVE(S) | INPUT | OUTPUT |
| Test Strategy Review | -Confirm development scope<br>-Estimate development effort<br>-Review test strategy with development participants<br>-Establish development milestones | -Unreviewed test strategy<br>-Reviewed intermediate design of result<br>-Reviewed specification | -Reviewed test strategy |
| Specification Stage Sign-off | -Confirming agreement re: specification, design, test strategy | - Reviewed specification<br>-Reviewed intermediate design of result<br>-Reviewed test strategy | -Confirmation of agreement of participants<br>-Released specification<br>-Released design of result<br>- Released test strategy |
| Test and Development Guide Update | -Gather info regarding test strategy | -Released specification<br>-Released intermediate design of result<br>-Released test strategy<br>-Requirements matrix | -Test and Development Guide |

435 — first row
440 — second row
445 — third row 325  330  335  340

FIG. 4B

DEVELOPMENT AND TEST PHASE
(Design Stage)

| TASK | OBJECTIVE(S) | INPUT | OUTPUT |
|---|---|---|---|
| Monitor Development Execution | -Manage project, including updating development timelines, workloads, expenses, and resources | -Released specification -Test and Development Guide | -Representations of progress |
| Create Scenario Design/ Component Architecture | -Describe design structure and function -Describe involved components and component functionality -Assess complexity, risk, | -Released specification -Released intermediate design of result | -Unreviewed scenario design/ component architecture -Additional description of the development result |
| Review Scenario Design/ Component Architecture | -Ensure that scenario design/ component architecture maps to specification, is feasible, supported by participants -Document and resolve open issues -Release scenario design/ component architecture | -Unreviewed scenario design/component architecture | -Reviewed scenario design |
| Create Scenario Documentation | -Create scenario documentation -Translate scenario documentation | -Reviewed scenario design, component architecture | -Scenario documentation |
| Component Design | -Document required structure and function necessary in the development phase as a basis for implementation. -Refine interfaces between components - Document component designs, design decisions, and how design decisions reached | -Reviewed scenario design, component architecture | -Component Design |
| Review Component Design | -Validate designs of components -Document and resolve open issues -Release component design | -Component Design -Component Architecture | -Reviewed Component Design |

505 — Monitor Development Execution
510 — Create Scenario Design/Component Architecture
515 — Review Scenario Design/Component Architecture
520 — Create Scenario Documentation
525 — Component Design
530 — Review Component Design

325 — TASK
330 — OBJECTIVE(S)
335 — INPUT
340 — OUTPUT

| DEVELOPMENT AND TEST PHASE (Implementation Stage) ||||
|---|---|---|---|
| TASK | OBJECTIVE(S) | INPUT | OUTPUT |
| Monitor Development Execution | -Manage project, including updating development timelines, workloads, expenses, and resources | -Existing development documentation | -Representations of development |
| Kickoff Implementation | -Communicate development guidelines, design, and standards to participants<br>-Initiate implementation | -Existing development documentation including component design and standards | -Well prepared development team |
| Test Catalogue Creation | -Outline planned test process<br>-Document test administration, sequence, naming conventions, and documentation of test cases<br>-Include preexisting test cases, supplement preexisting test cases, and create new test cases as appropriate | -Specification<br>-Test strategy<br>-Preexisting test catalogues | -Unreviewed test catalogue<br>-Test case descriptions<br>-Requirements traceability matrix |
| Implementation | -Implement and check development result<br>-Review development result in light of relevant standards<br>-Update description of development activities<br>-Create draft version of documentation | -Existing development documentation including component design and standards | -Implemented result<br>-Updated development documentation<br>-Draft version of documentation |
| Test Catalogue Review | -Evaluate Test Catalogue<br>-Finalize test cases<br>-Obtain agreement of participants | -Unreviewed test catalogue and test cases<br>-Requirements traceability matrix | -Reviewed test catalogue<br>-Reviewed requirements traceability matrix<br>-Documentation of test catalogue review |
| Test Readiness Confirmation | -Confirm that test resources are scheduled and available<br>-Modify or reschedule tests as appropriate | -Test readiness criteria | -Test readiness confirmation |

| DEVELOPMENT AND TEST PHASE (Implementation Stage) ||||
|---|---|---|---|
| TASK | OBJECTIVE(S) | INPUT | OUTPUT |
| Development Testing | -Perform development tests<br>-Iteratively correct problems and retest<br>-Update documentation | -Implemented result<br>-Specification<br>-Design<br>-Test Case<br>-Testing Resources | -Test results<br>-Problem corrections and tested result<br>-Updated Documentation |
| Supplemental Testing | -Supplement characterization of development result beyond development tests | -Implemented result | -Supplemental test results |
| Result Freeze | -Limit further development of development result<br>-Consolidate development result with documentation | -Implemented result<br>-Specification<br>-Design<br>-Test results<br>-Updated Documentation | -Frozen development result<br>-Consolidated development result and documentation |
| Module Integration Testing | -Validate components function as integrated whole<br>-Validate interfaces between components<br>-Correct errors, revalidate as appropriate<br>-Identify remaining issues, degree of completion | -Implemented result<br>-Specification<br>-Design<br>-Test Case<br>-Testing Resources | -Test results<br>-Problem corrections and tested result<br>-Updated Documentation |
| Technical Specification Creation | -Document detailed technical characteristics of development result<br>-Assess advantages, fulfillment of development requirements and design characteristics | -Existing development documentation<br>-Development Result<br>-Test Results | -Unreviewed technical specification<br>-Assessment of advantages, fulfillment of development objectives |
| Technical Specification Review | -Validate technical specification<br>-Validate assessment of advantages, fulfillment of development objectives | -Unreviewed technical specification<br>-Assessment of advantages, fulfillment of development objectives | -Reviewed technical specification<br>-Validated assessment of advantages, fulfillment of development objectives |

FIG. 6B

| DEVELOPMENT AND TEST PHASE (Implementation Stage) ||||
|---|---|---|---|
| TASK | OBJECTIVE(S) | INPUT | OUTPUT |
| Test Systems and Tester Preparation | -Prepare test systems and participants for acceptance test<br>-Develop tools allowing result to operate in intended environment<br>-Inform testers about development result and test procedures | -Development result<br>-Test catalogue<br>-Technical specification<br>-Test resources | -Prepared test resources<br>-Test plans<br>-Operational tools |
| User Documentation | -Develop and record user information<br>-Translate user information | -Specification<br>-Component design<br>-Additional information provided by developers | -User documentation<br>-Confirmation of open issues, degree of completion |
| Component Assembly | -Construct final assembly of components for maintenance or tests, including acceptance test<br>-Execute test upgrade, test implementation<br>-Assess complexity | -Validation plan<br>-Tested objects | -Final assembly of components |
| Master Guide Checklist Update | -Detail system environment and constraints<br>-Assess complexity, risk | -Specification<br>-Scenario and component design<br>-Component installation and upgrade info | - Master guide checklist |
| Test Readiness Confirmation | -Ensure that development is ready for additional tests<br>-Confirm sufficiency of documentation and previous test results<br>-Determine start of testing<br>-Summarize in maturity report<br>-Create test readiness review | -Specification<br>-Scenario and component design<br>-Component installation and upgrade information | -Test readiness review<br>-Maturity report |
| Development Result to Test Transfer | -Transfer development result from implementation stage to test stage of development and test phase | -Development result<br>-Test readiness review<br>-Maturity report | -Development freeze |

665 — Test Systems and Tester Preparation
670 — User Documentation
675 — Component Assembly
680 — Master Guide Checklist Update
685 — Test Readiness Confirmation
690 — Development Result to Test Transfer

| DEVELOPMENT AND TEST PHASE (Test Stage) ||||
|---|---|---|---|
| TASK | OBJECTIVE(S) | INPUT | OUTPUT |
| Execution Monitoring | -Manage project, including updating development timelines, workloads, expenses, and resources | -Existing development documentation | -Representations of development |
| Acceptance Test Kick-off | -Communicate test guidelines, goals, and standards to participants<br>-Initiate testing | -Existing documentation | -Well prepared test team |
| Error Correction | -Limit development of implemented result<br>-Consolidate implemented result with documentation | Defect messages | -Corrections<br>-Retested functionality |
| Acceptance Testing | -Execute acceptance test<br>-Assess degree of completion of the development process | -Test strategy<br>-Test plans<br>-Test packages<br>-Other documentation | -Completed acceptance test<br>-Assessment of development process |
| Result Documentation Review | -Ensure that result documentation meets requirements | -Result documentation | -Reviewed result documentation |
| Emergency Correction | -Rectify high priority errors in development result | -Acceptance test results<br>-Tested version of development result | -Deliverable development result |
| Test Report Creation | -Document results from acceptance test | -Acceptance test results | -Test report |
| Handover | -Prepare and present development result and associated documentation | -Development result<br>-Documentation<br>-Component list | -Delivery of development result, documentation, component list |

- 705: Execution Monitoring
- 710: Acceptance Test Kick-off
- 715: Error Correction
- 720: Acceptance Testing
- 725: Result Documentation Review
- 730: Emergency Correction
- 735: Test Report Creation
- 740: Handover Columns: 325, 330, 335, 340

FIG. 7

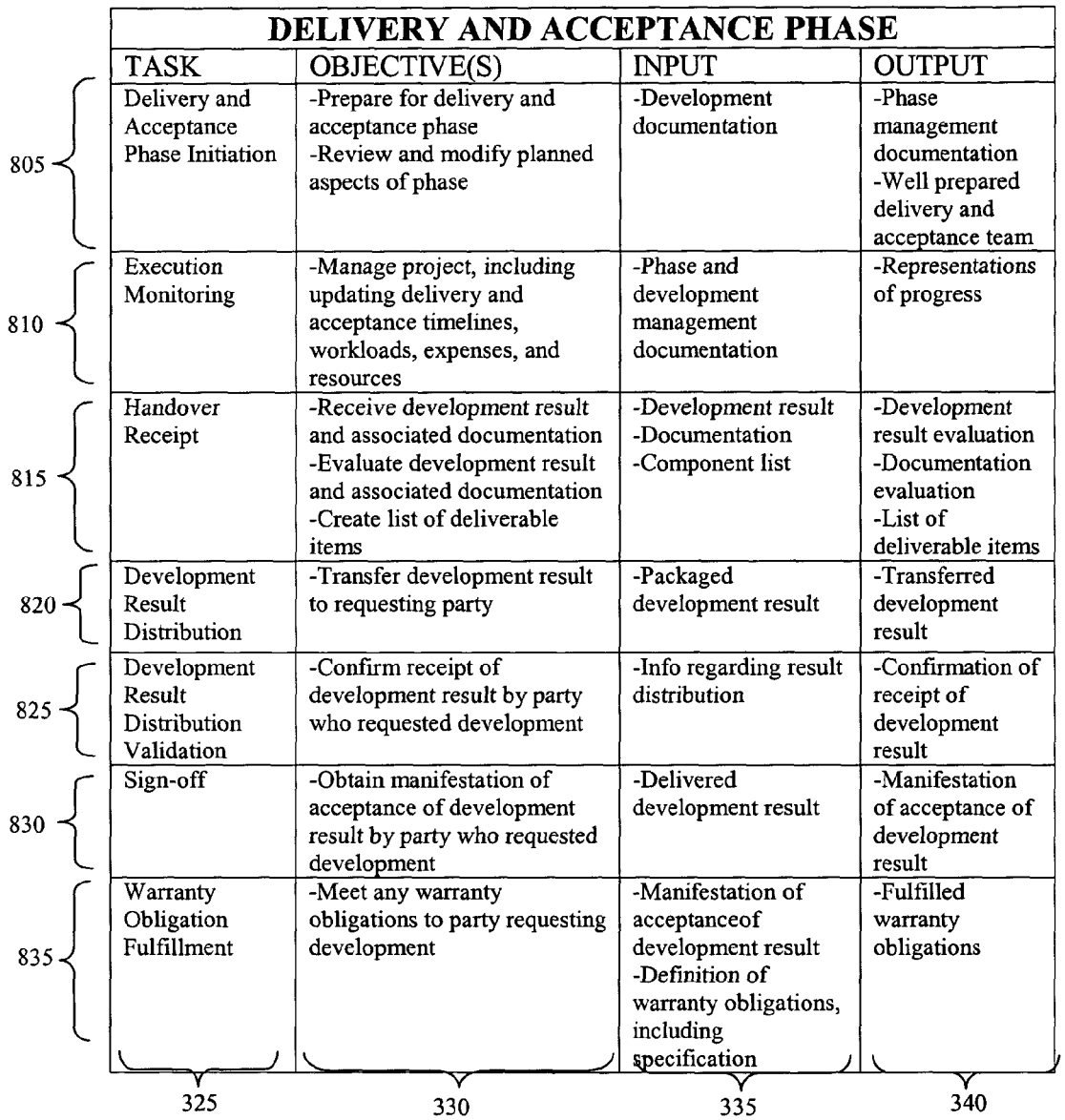

| DELIVERY AND ACCEPTANCE PHASE | | | |
|---|---|---|---|
| TASK | OBJECTIVE(S) | INPUT | OUTPUT |
| Delivery and Acceptance Phase Initiation | -Prepare for delivery and acceptance phase<br>-Review and modify planned aspects of phase | -Development documentation | -Phase management documentation<br>-Well prepared delivery and acceptance team |
| Execution Monitoring | -Manage project, including updating delivery and acceptance timelines, workloads, expenses, and resources | -Phase and development management documentation | -Representations of progress |
| Handover Receipt | -Receive development result and associated documentation<br>-Evaluate development result and associated documentation<br>-Create list of deliverable items | -Development result<br>-Documentation<br>-Component list | -Development result evaluation<br>-Documentation evaluation<br>-List of deliverable items |
| Development Result Distribution | -Transfer development result to requesting party | -Packaged development result | -Transferred development result |
| Development Result Distribution Validation | -Confirm receipt of development result by party who requested development | -Info regarding result distribution | -Confirmation of receipt of development result |
| Sign-off | -Obtain manifestation of acceptance of development result by party who requested development | -Delivered development result | -Manifestation of acceptance of development result |
| Warranty Obligation Fulfillment | -Meet any warranty obligations to party requesting development | -Manifestation of acceptanceof development result<br>-Definition of warranty obligations, including specification | -Fulfilled warranty obligations |

FIG. 8A

| MAINTENANCE PHASE (Production and Assembly Stage) | | | |
|---|---|---|---|
| TASK | OBJECTIVE(S) | INPUT | OUTPUT |
| 905 — Handover (Development and Testing to Production and Assembly) | -Receive development result and documentation from previous participant(s) | - Delivered development result and documentation -List of components | -Received development result and documentation -Production decision |
| 910 — Prototype Assembly | -Assemble components of development result into a single entity for validation | -Components | -Prototype |
| 915 — Prototype Validation in Reference Environment | -Validate component in reference environment -Validate core functions | -Validation plan -Prototype | -Validation results |
| 920 — Prototype Validation in Different Environment(s) | -Validate component in different environment | -Validation plan -Prototype | -Validation results |
| 925 — Installation Guide Creation | -Create instructions for bringing result into operating environment | -Prototype | - Installation guide |
| 930 — Assembly/Validation Status Reporting | -Describe status of production and assembly stage | -Prototype -Validation plan -Validation results | -Status reports |
| 935 — Project Management | -Gather and record production and assembly stage information | -Status and performance information | -Recorded project management data |
| 940 — Development Result Production | -Produce development result -Update descriptions of the development result and components | -Evaluated prototype -Descriptions of the development result and components | -Development result production -Updated descriptions |
| 945 — Prototype Validation Reporting | -Describe validation results and analysis of validation results | -Validation plan -Validation results -Validation result analysis | -Validation report |
| 950 — Handover (Production and Assembly to Customers and Maintenance) | -Prepare and present validated development result and documentation | -Validation plan -Validation results -Validation result analysis | -Presented development result -Release decision |

| MAINTENANCE PHASE (Maintenance Stage) | | | |
|---|---|---|---|
| TASK | OBJECTIVE(S) | INPUT | OUTPUT |
| 1005 — Maintenance Scheme Establishment | -Establish mechanisms for maintenance of the development result, including maintenance resources and other phase participants | -Predictions of maintenance frequency<br>-Development documentation | -Maintenance phase scheme |
| 1010 — Monitoring and Dispatch | -Monitoring maintenance events<br>-Dispatch personnel and resources | -Received maintenance events | -Dispatched maintenance events |
| 1015 — Problem Analysis | -Investigate and classify maintenance event and responsive maintenance activity | -Maintenance events | -Plan for responsive maintenance activity |
| 1020 — Maintenance Activity Performance | -Perform responsive maintenance activities | -Plan for responsive maintenance activity | -Performance of responsive maintenance activity |
| 1025 — Maintenance Activity Testing | -Assess efficiacy of performed maintenance activity | -Performed maintenance activity | -Test documentation |
| 1030 — Maintenance Information Propagation | -Proliferate information re maintenance activity | -Performed maintenance activity | -Proliferated maintenance activity info |
| 1035 — Maintenance Instruction Generation | -Generate instructions for performing maintenance activity | -Performed maintenance activity | -Maintenance instructions |
| 1040 — Maintenance Event Termination | -Signal resolution of maintenance event | -Closed maintenance event | -Maintenance event closure notice |
| 1045 — Maintenance Reporting | -Inform maintenance participant about resolution of maintenance event | -Closed maintenance event | -Maintenance event closure notice |
| 1050 — Development Request Evaluation | -Evaluate request for additional development of development result | -Development request | -Evaluation of additional development |
| 1055 — Correction Propagation | -Proliferate maintenance activity | -Maintenance activity | -Proliferated maintenance activity |

| EVALUATION PHASE |||||
|---|---|---|---|---|
| | TASK | OBJECTIVE(S) | INPUT | OUTPUT |
| 1203 | Lead Targeting and Gathering | -Identify and target customers and prospects | -Sales and marketing activity | -Generated leads |
| 1206 | Lead Qualification | -Qualify generated leads | -Generated Leads | -Qualified Leads |
| 1209 | Project/Service Request Handover | -Prepare and present lead to Roll-In Team | -Qualified lead | -Project/service request |
| 1212 | Project/Service Request Approval | -Consideration and approval of lead by roll-in team | -Project/service request | -Project/service request approval |
| 1215 | Information Gathering | -Collect more detailed information regarding project/service request | -Approved project/service request | -More detailed information regarding project/service request |
| 1218 | Opportunity Development | -Intensify contact with prospective customer | -Approved project/service request | -Enhanced relationship with prospective customer |
| 1221 | Opportunity Assessment | -Assess worthiness of proposed development for further evaluation | -Project/service request info<br>-Customer info | -Assessment of worthiness for evaluation |
| 1224 | Staffing/Project Prioritization Preclarification | -Investigate availability of resources<br>-Prioritize project/service request | -Project/service request info<br>-Customer info<br>-Custom development services info | -Overview of resource availability<br>-Project/service request prioritization |
| 1227 | Project/Service Request Approval | -Approve further investigation in project evaluation segment | -Project/service request info<br>-Customer info<br>-Custom development services info | -Qualified project/service request |
| 1230 | Evaluation Offer Presentation | -Create evaluation offer for the Customer | -Qualified project/service request | -Evaluation offer |
| 1233 | Evaluation Offer Negotiation | -Obtain customer acceptance of evaluation offer | -Evaluation offer | -Customer acceptance of evaluation offer |
| | 325 | 330 | 335 | 340 |

FIG. 12A

| EVALUATION PHASE ||||
|---|---|---|---|
| TASK | OBJECTIVE(S) | INPUT | OUTPUT |
| 1236 — Project Charter and Business Case Project Team Establishment | -Assemble resources for business case creation and evaluation segment | -Collected development info -Accepted evaluation offer | -Project charter -Evaluation team |
| 1239 — Customer Business Model and Business Process(es) Analysis | -Identify business initiatives in the areas that are in scope of the project | - Project charter -Evaluation team | -Business and industry info -Draft solution proposal |
| 1242 — Product Strategy Definition | -Delineate business strategy in areas in scope of proposed development | -Draft solution proposal | -Evaluated draft solution proposal |
| 1245 — Solution Proposal Creation | -Propose development of a development result | -Evaluated draft solution proposal | -Solution Proposal |
| 1248 — ARC Sheet Creation | -Identify the required scenarios and processes -Define participation in development process | -Solution proposal | -ARC sheet |
| 1251 — Solution Proposal Review | -Internal and external review of solution proposal | -Solution proposal | -Commitment to solution proposal |
| 1254 — Business Case Creation | -Summarize and document predicted viability of proposed development | -Reviewed solution proposal | -Draft business case |
| 1257 — Risk Analysis | -Evaluate risk associated with proposed development | -Development info | -Risk analysis |
| 1260 — Business Case Review | -Internal review of viability of the proposed solution | -Draft business case -Risk analysis | -Reviewed business case |
| 1263 — Business Case Approval and Sign-off | -Receive approval for the proposed solution | -Reviewed business case | -Approved business case |
| 1266 — Service/Project Proposal Creation | -Establish description of proposed solution for customer | -Approved business case | -Service/project proposal |

| EVALUATION PHASE ||||
|---|---|---|---|
| TASK | OBJECTIVE(S) | INPUT | OUTPUT |
| Service/Project Proposal Negotiation | -Agree with customer regarding proposed solution | -Project/service proposal | -Customer agreement to service/project proposal |
| Handover to Development | -Plan development stage | -Customer agreement to service/project proposal | -Development stage plan |
| License and Service Agreement Check | -Confirm scope and propriety of existing license and service agreements | -Existing license and service agreements -Service/project proposal | -Confirmation of scope |
| Framework Agreement Negotiation | -Reach framework agreement for proposed solution | -Service/project proposal | -Framework agreement |
| Statement of Work Negotiation | -Define proposed development with customer | -Framework agreement -Business case -Solution proposal -Service/project proposal | -Statement(s) of work |
| Contract Execution and Filing | -Obtain and store joint manifestation of acceptance of proposed development | -Statement(s) of work -Unexecuted contract | -Executed contract |

1269 — Service/Project Proposal Negotiation
1272 — Handover to Development
1275 — License and Service Agreement Check
1278 — Framework Agreement Negotiation
1281 — Statement of Work Negotiation
1284 — Contract Execution and Filing

| PROJECT MANAGEMENT | | | |
|---|---|---|---|
| TASK | OBJECTIVE(S) | INPUT | OUTPUT |
| 1402 — Development and Test Phase Initiation | -Manage transition from evaluation phase to development and test phase<br>-Establish core project team | -Business case<br>-Solution proposal<br>-Statement of work | -Core project team |
| 1404 — Project Steering Committee Establishment | -Recruit project steering committee members | -Business case<br>-Solution proposal<br>-Statement of work<br>-Executed contract | -Identity of project steering committee members |
| 1406 — Handover Evaluation and Engagement | -Review and evaluate deliverables from the Evaluation Phase | -Business case<br>-Solution proposal<br>-Statement of work -<br>ARC sheet<br>-Executed contract<br>-Service/project proposal | -Confirmation of handover |
| 1408 — Deliverables Sign-off | -Confirm acceptability of deliverables from evaluation phase | -Business case<br>-Solution proposal<br>-Statement of work<br>-ARC sheet<br>-Executed contract<br>-Service/project proposal | -Finalization of evaluation<br>-Confirmation of acceptability of deliverable |
| 1410 — Specification Stage Initiation | -Begin specification stage | -Business case<br>-Solution proposal<br>-Statement of work<br>-ARC sheet<br>-Executed contract<br>-Service/project proposal | -Specification stage commencement |
| 1412 — Project Lifecycle Repository Initiation | -Prepare project lifecycle repository | -Project milestone plan | -Initiated Project Lifecycle Repository |
| 1414 — Project Lifecycle Repository Check-in | -Transfer acceptable documents from evaluation phase into project repository | -Business case<br>-Solution proposal<br>-Statement of work<br>-ARC sheet<br>-Executed contract<br>-Service/project proposal | -Populated project lifecycle repository. |
| 1416 — Project Structure Creation | -Establish project structure for project monitoring and project management | -Business case<br>-Solution proposal<br>-Statement of work<br>-ARC sheet<br>-Executed contract<br>-Service/project proposal | -Project structure |

| PROJECT MANAGEMENT | | | |
|---|---|---|---|
| TASK | OBJECTIVE(S) | INPUT | OUTPUT |
| Product and Production Management System Update | -Enter, review, and update PPMS entries | -Existing PPMS entries | -Updated PPMS entries |
| Legal Agreement Completion | -Ensure all necessary legal agreements with customer have been reached | -Statement(s) of work<br>-Unexecuted contract<br>-Executed contract | -Confirmation of necessary legal agreements |
| System Landscape Planning and Procurement | -Identify, document, and procure technical infrastructure for system environment | -Development technical requirements<br>-Solution proposal<br>-Statement of work<br>-Service/project proposal | -System landscape |
| ARC Sheet Update | -Update ARC sheet to reflect current state of development and development process | -ARC sheet<br>-Component view | -Updated ARC sheet |
| Shared Services Engagement Planning | -Identify and arrange development activities performed by shared services | -Evaluation phase documentation<br>-Project plan | -Arrangement of shared services engagement<br>-List of activities for each shared service<br>-Detail for project plan |
| Project Plan Detailing | -Refine and update project plan | -Project plan | -More detailed project plan |
| Project Organization and Team Member Identification | -Specify structure, roles, and responsibilities for development process | -Project plan<br>-Staffing info<br>-Shared services engagement arrangements | -Project organization<br>-List of development participants and roles<br>-Resource plan |
| Customer Involvement Planning and Approval | -Define and receive customer acceptance of role in the development process | -Project plan<br>-Project organization<br>-Legal agreement(s) with customer | -List of key contacts at customer<br>-Defintion and acceptance of customer role |
| Participant Commitment Confirmation | -Confirm commitment of participants to development process | -Project plan<br>-ARC sheet<br>-Resource plan | - Participant commitments |

Tasks 1418–1434 (left labels); columns 325, 330, 335, 340.

FIG. 14B

| PROJECT MANAGEMENT | | | |
|---|---|---|---|
| TASK | OBJECTIVE(S) | INPUT | OUTPUT |
| 1436 — Preliminary Test Phase Planning | -Preliminary planning of testing approaches | -Existing test approaches/protocols<br>-Project plan | -Preliminary plans for testing |
| 1438 — Project Charter Management | -Create, update, review, and approve project charter | -Project plan<br>-Project organization<br>-Legal agreement(s) with customer<br>-Resource plan | -Completed and approved project charter. |
| 1440 — Communication Management Development | -Define and document processes and plans for managing project communications | -Project plan<br>-Project organization<br>-Resource plan | -Communication management processes and plans |
| 1442 — Risk Management | -Establish and implement a risk management plan | -Risk evaluation expertise<br>-Risk analysis from Evaluation Phase | -Risk management plan<br>-Risk management |
| 1444 — Development Issue Tracking | -Track and review development issues | -Issue tracking processes and procedures<br>-Issue info | -Tracked issues |
| 1446 — Change Management | -Manage transition of activities or aspects of development process | -Change management approaches<br>-Development info | -Managed transitions |
| 1448 — Lessons Learned Tracking | -Identify and document teachings applicable to other development efforts | -Development info | -Lessons learned documentation |
| 1450 — Project Monitoring Plan Development and Implementation | -Define and implement monitoring plan | -Risk management plan<br>-Project plan<br>-Cost tracking procedures<br>-Development info | -Project monitoring plan |
| 1452 — Documentation Recording and Release | -Archive and release relevant documents<br>-Release master plan | -Development documentation | -Document archive<br>-Draft master plan |
| 1454 — Project Structure Update | -Update project structure | -Project structure<br>-Development info | -Updated project structure |

| PROJECT MANGEMENT |||||
|---|---|---|---|---|
| | TASK | OBJECTIVE(S) | INPUT | OUTPUT |
| 1456 | Project Kickoff | -Reviewing development info with development participants | -Appropriate portions of project management deliverables (e.g., project plan, customer involvement plan, risk management plan) | -Well-prepared participants -Project logistics |
| 1458 | Quality Characteristics Planning | -Develop strategy for ensuring quality of development | -Development requirements | -Quality characteristics plan -Quality documentation |
| 1460 | Retrofit Planning | -Plan installation of development result into existing framework | -Arc sheet -Project charter | -Retrofit plan |
| 1462 | Maintenance Planning | -Establish maintenance team, maintenance processes, and maintenance infrastructure | -Legal agreements -Project Charter -Service/project proposal | -Maintenance plan |
| 1464 | Production Validation Planning | -Develop production validation plan to test development result | -Validation plan template | - Production validation plan |
| 1466 | Specification Stage Sign-off | -Obtain manifestation of customer acceptance of specification | -Specification -Specification approval form | -Manifestation of acceptance of specification |
| 1468 | Specification Documentation Check-in | -Archive specification stage documentation | -Released specification -Other specification stage documentation | -Documentation archive |
| 1470 | Execution Monitoring | -Project management of the design stage | -Released specification -Test and development guide -Design stage documentation | -Representations of progress in design stage |
| 1472 | Design Stage Sign-off | -Obtain manifestation of customer acceptance of design stage deliverables | -Design stage deliverables -Design deliverables approval form | -Manifestation of acceptance of design deliverables |
| 1474 | Design Documentation Check-in | -Archive design stage documentation | -Design stage documentation, deliverables | -Documentation, deliverable archive |
| | 325 | 330 | 335 | 340 |

FIG. 14D

| PROJECT MANAGEMENT | | | |
|---|---|---|---|
| TASK | OBJECTIVE(S) | INPUT | OUTPUT |
| Execution Monitoring | -Project management of the implementation stage | -Implementation stage documentation | -Representations of progress in implementation stage |
| Implementation Stage Sign-off | -Obtain manifestation of customer acceptance of implementation stage deliverables | -Implementation stage deliverables -Implementation deliverables approval form | -Manifestation of acceptance of implementation deliverables |
| Implementation Documentation Check-in | -Archive implementation stage documentation | -Implementation stage documentation, deliverables | -Documentation, deliverable archive |
| Execution Monitoring | -Project management of the test stage | -Test stage documentation | -Representations of progress in test stage |
| Handover | -Prepare and present development result and associated documentation | -Development result -Documentation -Component list | -Delivery of development result, documentation, component list |
| Maintenance Handover | -Prepare and present development result and documentation to maintenance phase participant(s) | -Development result and documentation | -Equipped maintenance participants -Development result integrated into operating environment |
| Test Stage Sign-off | -Obtain manifestation of customer acceptance of tested development result | -Handover of development result | -Manifestation of acceptance of tested development result |
| Test Documentation Check-in | -Archive test stage documentation | -Test stage documentation, development result | -Documentation, development result archive |
| Execution Monitoring | -Project management of the delivery and acceptance phase | -Delivery and acceptance documentation | -Representations of progress in delivery and acceptance phase |
| Delivery and Acceptance Phase Initiation | -Prepare for delivery and acceptance phase -Review and modify planned aspects of phase | -Development documentation | -Phase management documentation -Well prepared delivery and acceptance team |

1476 — Execution Monitoring
1478 — Implementation Stage Sign-off
1480 — Implementation Documentation Check-in
1482 — Execution Monitoring
1484 — Handover
1486 — Maintenance Handover
1488 — Test Stage Sign-off
1490 — Test Documentation Check-in
1492 — Execution Monitoring
1494 — Delivery and Acceptance Phase Initiation

| TASK | OBJECTIVE(S) | INPUT | OUTPUT | ENTITY RESPONSIBLE | ENTITY ACCOUNTABLE | RESOURCE IDENTIFIER |
|---|---|---|---|---|---|---|
| | | | DEVELOPMENT PROCESS ASPECT | | | |
| Task A | -Task A objective | -Input A | -Output A | -Entity A1 | -Entity A2 | -Instruction Set A<br>-Documentation Guidelines A |
| Task B | -Task B objective | -Input B | -Output B | -Entity B1 | -Entity B1 | -Template B |
| Task C | -Task C objective | -Input C | -Output C | -Entity C1 | -Entity C1<br>-Entity C2 | -Instruction Set C1<br>-Instruction Set C2<br>-Documentation Guidelines C |
| Task ... | -Task ... objective | -Input ... | -Output ... | -Entity ... | -Entity ... | -Documentation Guidelines ... |

DEVELOPMENT PROCESSES REPRESENTATION AND MANAGEMENT

CROSS REFERENCE TO RELATED APPLICATIONS

This application claims the benefit of priority from both U.S. Provisional Application entitled "Development Processes Representation and Management," filed Jan. 27, 2003, Application Ser. No. 60/443,278 and U.S. Provisional Application entitled "Method of Executing Customer-Driven Software Development Projects," filed Aug. 30, 2002, Application Ser. No. 60/407,446.

BACKGROUND

The following description relates to the representation and management of development processes, such as software development processes.

Processes such as product development projects can be represented using frameworks such as flowcharts. A flowchart typically identifies the names of different steps along with a classification of the type of the step. Flowchart step classifications are start/stop steps, decision steps, activity steps, document steps, connector steps, and delay steps. In a flowchart, the steps can be connected with arrows that can represent, e.g., to the order in which the steps are performed and/or the flow of information or material through the process.

SUMMARY

The present application describes systems and techniques relating to the representation and management of development processes. The present inventors recognized that conventional systems and techniques for representing and managing development processes were often haphazard, inflexible, and incomplete. For example, conventional systems and techniques often omitted to represent or manage significant issues and stages that may occur during development processes and provided only a rudimentary classification of the activities in a process. Further, conventional systems and techniques are often directed only to a portion of a development process and/or directed only to specific kinds of development processes that omit certain issues. This limitation may be due, in part, to the limited information that can be included in conventional systems and techniques.

Moreover, conventional systems and techniques often failed to yield a durable machine-readable record of development processes to support quantitative data analysis but rather relied on intuitive assessments of prior known development processes. Such intuitive assessments were subject to the vagaries of institutional memory, including employee turnover and insufficient information exchange across departmental and site boundaries in an enterprise.

Accordingly, the inventors have developed systems and techniques for managing and representing development processes.

In one aspect, the systems and techniques include a method including providing a cookbook describing tasks in a framework of the development process and managing performance of the development process with the cookbook. A first task description in the cookbook identifies an activity in the development process, an input for performance of the activity, an output consequential of performance of the activity, and instructions for performance of the activity. Managing performance of the development process with the cookbook includes assigning activities in the development process to different participants in accordance with the activities identified in the task descriptions, exchanging information between participants in accordance with the inputs and outputs identified in the task descriptions, and instructing the participants in accordance with the instructions identified in the task descriptions.

These and other aspects can include one or more of the following features. Providing the cookbook can include providing a regular arrangement of task descriptions in one or more matrices. A first collection of task descriptions in a first track of the development process and a second collection of task descriptions in a second track of the development process can also be provided. The first collection can be directed to development of a result. The second collection can be directed to project management of the development of the result.

The cookbook can be provided in a collection of frameworks. The frameworks can include one or more of an evaluation phase wherein a request for a proposed development is received and evaluated, a development and test phase wherein a development result is developed and tested, a delivery and acceptance phase wherein the development result is delivered to and accepted by the party who requested development, and a maintenance phase wherein the development result is maintained.

In another aspect, a method includes receiving a superset of task descriptions describing potential tasks in development processes, selecting a relevant set of task descriptions from the superset, the relevant set fit to a particular development process, and arranging the relevant set in a framework for performing the particular development process.

This and other aspects can include one or more of the following features. The received superset of task descriptions can be organized by phases in the development process. The phases can include one or more of an evaluation phase wherein a request for a proposed development is received and evaluated, a development and test phase wherein a development result is developed and tested, a delivery and acceptance phase wherein the development result is delivered to and accepted by the party who requested development, and a maintenance phase wherein the development result is maintained. The superset of task descriptions can be organized by tracks in the development process. For example, a first track can be directed to development of a result and a second track directed to project management of the development of the result.

In another aspect, a system includes a superset of task descriptions describing potential tasks in development processes. A first task description in the superset can identify a first activity in the development process, a first input for performance of the first activity, a first output consequential of performance of the first activity, and instructions for performing the first activity.

This and other aspects can include one or more of the following features. The instructions can include information regarding location of the first input when the first input is part of an output of a second activity in a development process, and information regarding generation of the first input in an absence of the second activity from the development process.

The superset can be organized by phases in the development process. The phases can include an evaluation phase wherein a request for a proposed development is received and evaluated, a development and test phase wherein a development result is developed and tested, a delivery and acceptance phase wherein the development result is delivered to and accepted by the party who requested development, and a maintenance phase wherein the development result is maintained.

The system can also include a framework for assembly of a relevant set of task descriptions from the superset. The relevant set of task descriptions can be fit to the development process. The framework can be a matrix for regular arrangement of task descriptions in rows and columns. The system can also include a selection mechanism to select the relevant set of task descriptions from the superset.

The superset of task descriptions can include at least fifty task descriptions selected from a collection of tasks. The collection of tasks can include a lead generation task, a lead qualification task, an evaluation task, a negotiation task, a specification creation task, a specification review task, an intermediate design task, a prototype creation task, a design review task, a test strategy definition task, a test strategy review task, a specification stage sign-off task, a test and development guide update task, a monitor development execution task, a create scenario design/component architecture task, a review scenario design/component architecture task, a create scenario documentation task, a component design task, a review component design task, a monitor development execution task, a kickoff implementation task, a test catalogue creation task, an implementation task, a test catalogue review task, a test readiness confirmation task, a development testing task, a supplemental testing task, a result freeze task, a module integration testing task, a technical specification creation task, a technical specification review task, a test systems and tester preparation task, a user documentation task, a component assembly task, a master guide checklist update task, a test readiness confirmation task, a development result to test transfer task, an execution monitoring task, an acceptance test kick-off task, an error correction task, an acceptance testing task, a result documentation review task, an emergency correction task, a test report creation task, a handover task, a delivery and acceptance phase initiation task, an execution monitoring task, a handover receipt task, a development result distribution task, a development result distribution validation task, a sign-off task, a warranty obligation fulfillment task, a sales/marketing material creation task, a scenario validation task, a maintenance handover task, a maintenance sign-off task, a transition to maintenance task, a phase close-out task, a development performance reporting task, a development process analysis task, a participant debriefing task, a document check-in task, a close-out checklist completion task, a close-out checklist review task, a handover (development and testing to production and assembly) task, a prototype assembly task, a prototype validation in reference environment task, a prototype validation in different environment(s) task, an installation guide creation task, an assembly/validation status reporting task, a project management task, a development result production task, a prototype validation reporting task, a handover (production and assembly to customers and maintenance) task, a maintenance scheme establishment task, a monitoring and dispatch task, a problem analysis task, a maintenance activity performance task, a maintenance activity testing task, a maintenance information propagation task, a maintenance instruction generation task, a maintenance event termination task, a maintenance reporting task, a development request evaluation task, and a correction propagation task.

The superset of task descriptions can include at least sixty tasks selected from the collection. The superset of task descriptions can include at least seventy tasks selected from the collection. The superset of task descriptions can include at least seventy five tasks selected from the collection.

The descriptions of the lead generation task, the lead qualification task, the evaluation task, and the negotiation task comprise at least fourteen task descriptions selected from a second collection of tasks. The second collection of tasks can include a lead targeting and gathering task, a lead qualification task, a project/service request handover task, a project/service request approval task, an information gathering task, an opportunity development task, an opportunity assessment task, a staffing/project prioritization preclarification task, a project/service request approval task, an evaluation offer presentation task, an evaluation offer negotiation task, a project charter and business case project team establishment task, a customer business model and business process(es) analysis task, a product strategy definition task, a solution proposal creation task, an ARC sheet creation task, a solution proposal review task, a business case creation task, a risk analysis task, a business case review task, a business case approval and sign-off task, a service/project proposal creation task, a service/project proposal negotiation task, a handover to development task, a license and service agreement check task, a framework agreement negotiation task, a statement of work negotiation task, and a contract execution and filing task.

The lead generation task description, the lead qualification task description, the evaluation task description, and the negotiation task description can include at least twenty tasks selected from the second collection or at least twenty five tasks selected from the second collection.

In another aspect, a method can include providing one or more matrices describing tasks that define a phased, project development methodology to be used in a development process. A first of the tasks can receive output information from a second of the tasks when the second of the tasks is retained in the development process. The first task can also provide a description regarding obtaining the output information when the second task is disregarded in the development process.

This and other aspects can include one or more of the following features. The one or more matrices can describe tasks by identifying an activity in the development process, an input corresponding to performance of a second activity in the development process, an output consequential of performance of the activity, and a link to a corresponding template for performance of the activity. The method can also include selecting one or more of the tasks in the one or more matrices, generating a phased, software product development methodology using a set of the templates corresponding to the selected tasks, and managing a software development process using the generated software product development methodology.

The described systems and techniques can be implemented to realize one or more of the following advantages. The described systems and techniques for representing and managing development processes can be rational, flexible, and expansive. For example, the systems and techniques can include structured approaches to an extensive array of aspects of development processes, including aspects that are not common to all development processes. The approaches can be flexibly modified to eliminate unnecessary aspects without impairing the management or representation of other aspects.

The approaches to representing and managing development processes can be used to yield a durable, accessible, and structured record of development processes in an enterprise. Such approaches can support information exchange across the boundaries inside an enterprise and information exchange with external entities, such as customers who hire an enterprise to perform a development process. Such a record can also support quantitative data analysis and establish an institutional memory of previous or current development processes. The record can be stored in machine-readable format.

The described systems and techniques for representing and managing development processes can provide an organizational structure, procedures, activities, and resources for developing or providing a quality product or service to a customer. The techniques and systems can provide a unified customer driven approach and common understanding of a product or business development process, as well as the sequence of operations and the management of systems in such a process. The techniques and systems can be used to establish a product development standard that promotes high quality, consistency, and efficiency, as well as the establishment of a continuous framework for improving and maintaining both products and the product development process.

The standardization of product development processes can be performed using a systematic identification of approaches and tasks for identification, documentation, training, communication, and control of product development. The product development processes can be evolved by examining records of previous product development efforts, and product development efforts can be adjusted to meet the needs of diverse industries, the varying needs of customers, and evolving technology.

The techniques and systems can be used to establish a phased, development life cycle methodology. The techniques and systems can include information assemblies (such as document collections and machine-readable data files) for development phases and support systems. The information assemblies can describe, e.g., the tasks and activities to be completed for each stage in the development of a product. In addition to quality-based review tasks, which can be included within each information assembly, the entire product development process can be audited for compliance with standards for product development. Moreover, the product development process itself can be improved based on the results of using these techniques and systems to represent and perform product development. The improvement of the product development process can be done in accordance with global quality management policies and procedures.

In an information assembly, information describing tasks or portions of tasks can be deleted or changed to fit a process based on cost, schedule, resources, technology, and other internal or external needs. A portion of the relationship between the descriptions of unchanged or undeleted tasks can be maintained when other descriptions of task (or portions of descriptions of tasks) are changed or deleted. This can eliminate the need to conduct time intensive analyses, impact investigation, and documentation of model changes that are typical when established techniques for describing processes, such as flowcharts, are changed.

The techniques and systems can be used for establishing product development standards, promotional marketing, competitive marketing, marketing of methods in how to best develop a life cycle methodology/model, and marketing of extracted and combined information from matrices (process assembly modules).

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIGS. 4A and 4B show a cookbook for managing and representing the specification stage of a development and test phase of a development process.

FIG. 5 shows a cookbook for managing and representing the design stage of a development and test phase of a development process.

FIGS. 6A, 6B, and 6C show a cookbook for managing and representing the implementation stage of a development and test phase of a development process.

FIG. 7 shows a cookbook for managing and representing the test stage of a development and test phase of a development process.

FIGS. 8A, 8B, and 8C show a cookbook for managing and representing the delivery and acceptance phase of a development process.

FIG. 9 shows a cookbook for managing and representing the production and assembly stage of a maintenance phase of a development process.

FIG. 10 shows a cookbook for managing and representing the maintenance stage of a maintenance phase of a development process.

FIGS. 12A, 12B, and 12C show a cookbook for managing and representing the evaluation phase of a development process.

FIGS. 14A, 14B, 14C, 14D, and 14E show a cookbook for managing and representing project management of a development process.

FIG. 15 shows another implementation of a cookbook for managing and representing a development process.

Technical Appendix 1 shows another implementation of a cookbook, along with example templates for managing and representing a software development process.

Like reference symbols in the various drawings indicate like elements.

DETAILED DESCRIPTION

The systems and techniques described here relate to managing and representing development processes.

Figure 1A:
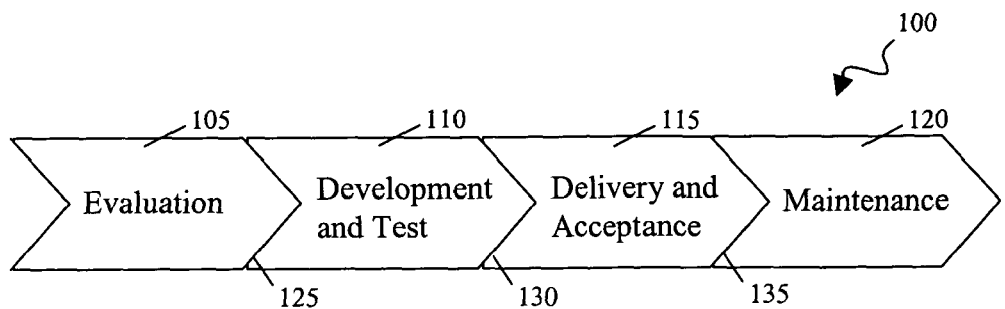
FIGS. 1A and 1B show frameworks of a development process.

FIG. 1A shows a framework of a development process 100. Development process 100 includes an evaluation phase 105, a development and test phase 110, a delivery and acceptance phase 115, and a maintenance phase 120 for the development of a product or a service. Phases 105, 110, 115, 120 can be used in systems and techniques to denote conceptual aspects of a development process. The denotation of such aspects can provide a framework that facilitates a structured and systematic approach to representing a development process and managing the development that occurs during the process.

Evaluation phase 105 can be the aspect of development process 100 in which opportunities for development are identified, qualified, and evaluated according to one or more criteria. Criteria can include the requirements of the development opportunity, the risks of the development opportunity, the resources deployable for developing the opportunity, and the benefits of developing the opportunity. Development and test phase 110 can be the aspect of development process 100 in which opportunities for development are refined to specify the desired development result and approaches to achieving the result are designed, implemented, and tested.

Delivery and acceptance phase 115 can be the aspect of development process 100 in which development results are produced, assembled, validated, delivered, and accepted by the receiving party. Depending on the nature of the development result, the order of production, assembly, validation, delivery, and acceptance can be changed and/or one or more of production, assembly, validation, delivery, and acceptance can be omitted. Maintenance phase 120 can be the aspect of development process 100 in which development results, including supporting media and documentation, are deployed and corrected, supported, upgraded, and improved.

Phases 105, 110, 115, 120 are separated by transitions 125, 130, 135 that represent the passage of development process 100 from one aspect to another. Transitions 125, 130, 135 can be arbitrary in that they do not represent strict delineations between aspects in development process 100, but rather are part of a framework for managing and representing development process 100. For example, the performance of component tasks of different phases 105, 110, 115, 120 can be simultaneous or inverted even though the tasks are nominally in sequence and separated by transitions 125, 130, 135. As another example, information regarding development process 100 is often exchanged between phases 105, 110, 115, 120 across transitions 125, 130, 135. Information can be exchanged in both directions, as appropriate.

Figure 1B:
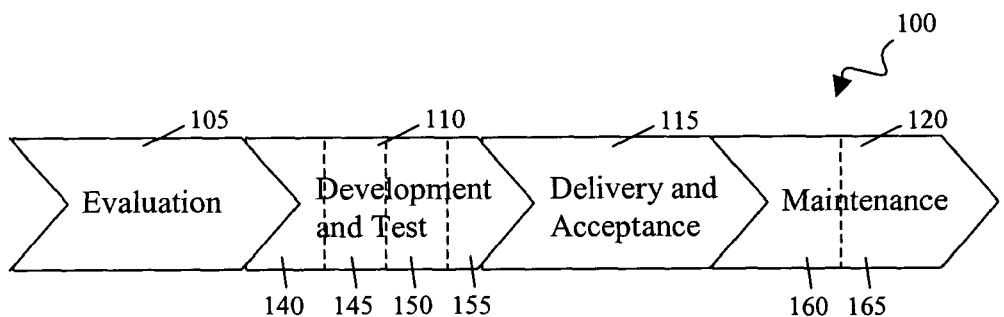

FIG. 1B shows another framework of development process 100. In addition to evaluation phase 105, development and test phase 110, delivery and acceptance phase 115, and maintenance phase 120, development process 100 also includes stages that further delineate conceptual aspects of a development process. In particular, development and test phase 110 includes a specification stage 140, a design stage 145, an implementation stage 150, and a test stage 155 while maintenance phase 120 includes a production and assembly stage 160 and a maintenance stage 165.

Specification stage 140 can be the aspect of development and test phase 110 in which the requirements for the development result are delineated. Design stage 145 can be the aspect of development and test phase 110 in which the scheme of the development result is conceived and delineated. Implementation stage 150 can be the aspect of development and test phase 110 in which the scheme of the development result is implemented. Test stage 155 an be the aspect of development and test phase 110 in which the implementation of the development result is tested.

Production and assembly stage 160 can be the aspect of maintenance phase 120 in which the development result is produced and assembled. Maintenance stage 165 can be the aspect of maintenance phase 120 in which the development result is maintained.

Figure 2:
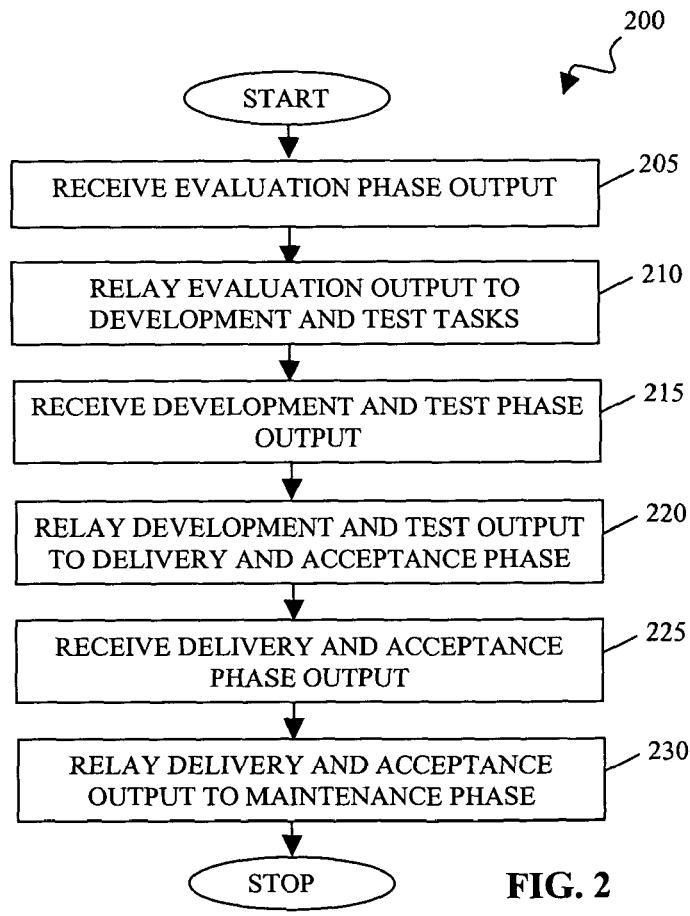
FIG. 2 is a flowchart showing information flow between phases of a development process.

FIG. 2 is a flowchart of a process 200 illustrating information flow between phases of a development process. Process 200 can be performed by a developer such as a development team, the manager of a development team, or a data processing device executing machine-readable instructions for the representation and management of development processes.

The developer performing process 200 receives the output of an evaluation phase at 205. The evaluation phase output can include a statement of work for the development process and framework of an agreement between the participants allocating various responsibilities in the development process. The developer can relay the received evaluation phase output to one or more tasks in the development and test phase at 210. The evaluation phase output can be used in the definition or performance of tasks in the development and test phase, to constrain the scope of tasks in the development and test phase, or to schedule the performance of tasks in the development and test phase.

The developer performing process 200 can also receive the output of the development and test phase at 215. The output of the development and test phase can include risk and change management assessments, development and cost control issues, assembly plans, documentation, and scheduling information for the development process. The developer can relay the received development and test phase output to one or more tasks in the delivery and acceptance phase at 220. The development and test phase output can be used in the definition or performance of tasks in the delivery and acceptance phase, to constrain the scope of tasks in the delivery and acceptance phase, or to schedule the performance of tasks in the delivery and acceptance phase.

The developer performing process 200 can also receive the output of the delivery and acceptance phase at 225. The output of the delivery and acceptance phase can include instructions and information relevant to the implementation and testing of the development results. The developer can relay the received delivery and acceptance phase output to one or more tasks in the maintenance phase at 230. The delivery and acceptance phase output can be used in the definition or performance of tasks in the maintenance phase, to constrain the scope of tasks in the maintenance phase, or to schedule the performance of tasks in the maintenance phase.

Process 200 can be performed by a developer using cookbooks to manage and represent a process. A cookbook is a description of one or more tasks in a development process. A cookbook can describe an identifier (such as a name) of a task, the input to the task, the objective(s) of the task, the output of the task, the entity responsible for performing the task, the entity accountable for the performance of the task, and instructions, standards, documentation guidelines, and other resources for performing the task. For example, a cookbook can describe instructions by identifying the name or memory location of a set of instructions. The tasks in a cookbook can be sequentially arranged in a framework for the management and representation of the development process. For example, the tasks can be arranged in one or more matrices. The matrices can be regular arrangements of task descriptions in columns or rows. For example, task names can be arranged into a column and associated information regarding the named task can be arranged in the corresponding rows. The matrices can be implemented in a spreadsheet such as Microsoft Excel™.

The tasks in a cookbook can be performed simultaneously, out of sequence, or omitted. The output from a task can be the input to a subsequent task. The tasks can be optional or particular to certain development processes. The tasks can be deleted or modified, and the deletion or modification can be accommodated by the cookbook. Deletion of a particular task can be accommodated by rearranging remaining tasks to close any gap caused by the deletion and ensure that any information that was to be generated during the deleted task is replaced or omitted in subsequent tasks. The description of a task can be customized to a specific development process to yield a durable, accessible, and structured record of the specific development process. Cookbooks, and the customization of task descriptions, can be stored in machine-readable format to facilitate information exchange within an enterprise and quantitative analysis of development processes.

Initially, a cookbook can include a superset of task descriptions describing the potential tasks in a development process. A user can customize the superset by eliminating tasks from the superset to yield a subset of task descriptions that are fit to a particular development process. The elimination of unfit tasks can be accommodated both within the framework of task descriptions (e.g., by eliminating the space between remaining tasks) and within the task descriptions themselves. For example, task descriptions can include some information that is relevant when another task is present, and other information that is relevant when the other task is absent. A user can thus select a subset of task descriptions fit to a particular development process. For example, a user can select around 50% of the task descriptions in the superset to form a subset of task descriptions fit to a particular development process. The user can also select around 60% of the tasks, around 70%, or around 82% of the task descriptions.

One or more cookbooks can be used to establish a methodology for a development process, such as a software development methodology. A methodology is a structured set of activities, methods, practices, and transformations. A methodology can be directed to a specific purpose, such as the development and maintenance of software and associated products. The methodology can describe activities and methods, identify activity roles and responsibilities, and include information identifying standard practice guidelines and documentation guidelines. The identifying information can be a memory location or other electronic linkage such as a uniform resource locator (URL).

Figure 3:
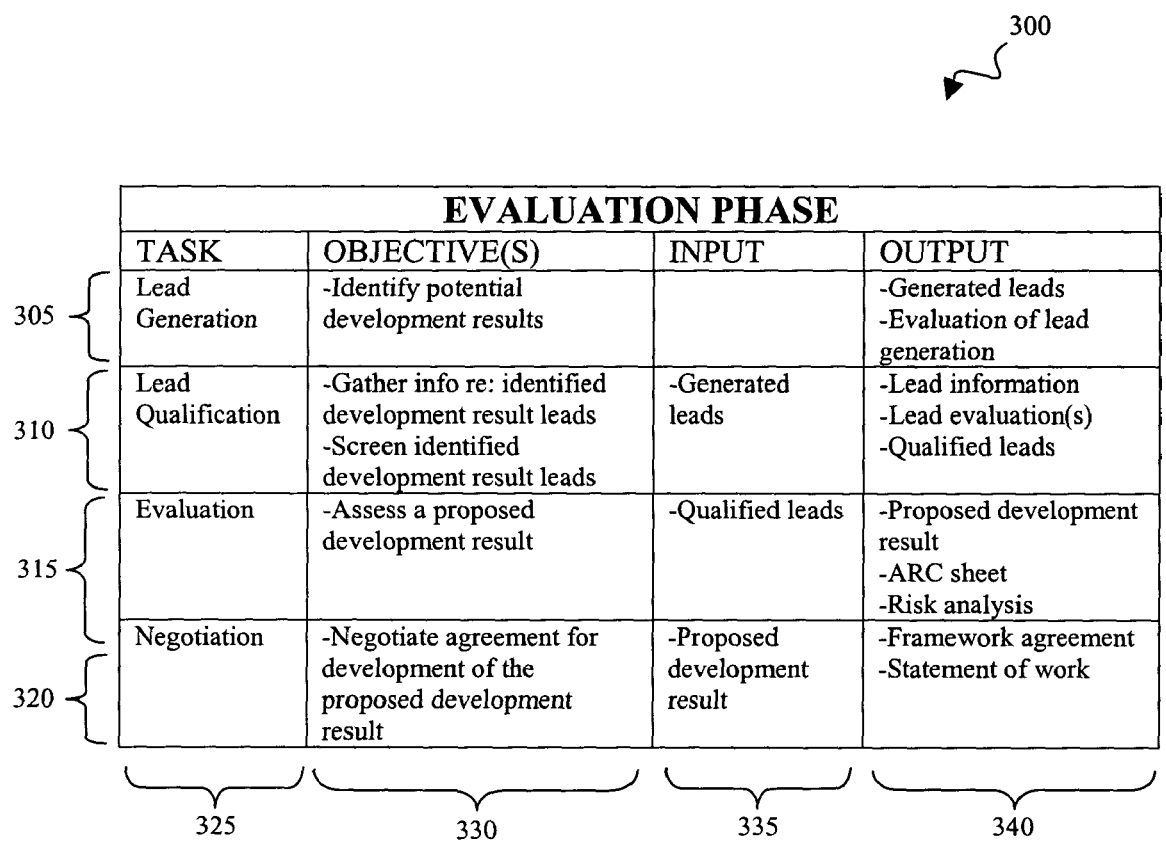
FIG. 3 shows a cookbook for managing and representing the evaluation phase of a development process.

FIG. 3 shows a cookbook 300 for managing and representing the evaluation phase of a development process. Cookbook 300 includes descriptions of a lead generation task 305, a lead qualification task 310, an evaluation task 315, and a negotiation task 320. Descriptions 305, 310, 315, 320 include an identifier 325, one or more objectives 330, one or more inputs 335, and one or more outputs 340. Descriptions 305, 310, 315, 320 can also include identifications of an entity responsible for performing the task, an entity accountable for performance of the task, and instructions, standards, documentation guidelines, and other resources for performing the task (not shown).

Lead generation task 305 is directed to identifying results that are potentially worthy of being developed. Potential development results can include new or improved products and services such as new software directed to a customer's specific requirements. The potential development results can be identified by surveying customers or participants in the development enterprise to identify results thought to be of value.

Lead qualification task 310 is directed to gathering further information regarding the generated leads and screening the generated leads for suitability for development. Information regarding the generated leads can be obtained from the entities that identified the leads as well as other entities that are interested in the development result or participate in the development. The leads generated in lead generation task 305 can then be screened to identify one or more leads worth developing.

Evaluation task 315 is directed to assessing a proposed development result for qualified leads from lead qualification task 310. The proposed development result can include a rough sketch of the proposed capabilities and advantages of the result, along with an assessment of the risk associated with the proposed development process.

Negotiation task 320 is directed to reaching an agreement regarding the development of the proposed development result. The development agreement can be a framework agreement and include a statement of work to be performed during the development process. The agreement can be reached with external parties such as a customer who generated the lead. The agreement can include contractual or other obligations specifying the commitments of parties to the development process.

FIGS. 4A and 4B show a cookbook 400 for managing and representing the specification stage of a development and test phase of a development process. Cookbook 400 includes descriptions of a specification creation task 405, a specification review task 410, a preliminary design task 415, a prototype creation task 420, a design review task 425, a test strategy definition task 430, a test strategy review task 435, test and development guide update task 440, and a specification stage sign-off task 445.

Descriptions 405, 410, 415, 420, 425, 430, 435, 440, 445 include identifier 325, one or more objectives 330, one or more inputs 335, and one or more outputs 340. Descriptions 405, 410, 415, 420, 425, 430, 435, 440, 445 can also include identifications of an entity responsible for performing the task, an entity accountable for performance of the task, and instructions, standards, documentation guidelines, and other resources for performing the task (not shown).

Specification creation task 405 is directed to identifying the scope and requirements of the development process, as well as specifying the end-user's requirements for the development result, through the creation of a specification. A specification is a collection of information such as a document or machine-readable file that states the requirements for the design or engineering development of a result. A specification can also identify how those requirements are planned to be fulfilled. In particular, specifications generally include detail describing desired performance characteristics of the development result. Specifications can be updated during development to reflect changes to the performance characteristics or the requirements for the development. Specifications can include requirements and/or performance characteristics of constituents elements of a system result. For example, a specification can include requirements for a system/subsystem as an entity, an allocation of requirements to functional areas of the system/subsystem, documentation regarding design constraints, and definition of the interfaces between or among functional areas and/or subsystems. Specifications can be created using information from end-users of the development result as well as information from an evaluation phase of a development process, including a proposed development result and analyses of the risks associated with the development.

Specification review task 410 is directed to validating the completeness and accuracy of specification created in specification creation task 405 and to identifying open issues that remain unspecified in the specification. The specification can be reviewed by the parties who created the specification or by other participants in the development process.

Intermediate design task 415 is directed to developing an intermediate design of the development result. The intermediate design can be a component level design in that it establishes a component framework for the result without elaborating on specific details regarding the components. In light of the intermediate design, the complexity and risk of the development process can be assessed.

Prototype creation task 420 is directed to refining the intermediate design of the result to yield a prototype of the design of the result. Prototypes are more relevant to selected industries and results than to others. For example, the creation of a prototype of a service may be less relevant to the development of the service than the creation of a prototype of a product is to the development of the product. The prototype can be used to refine the intermediate design of the development result.

Design review task 425 is directed to evaluating the intermediate design of the development result. The intermediate design can be refined by the creation of a prototype in prototype creation task 420, as appropriate. The intermediate design can be evaluated in light of the operating environment of the result and constraints upon the design. Further, the complexity, risk, and delivery of the development process can be assessed in light of the intermediate design. The intermediate design can be reviewed by the parties who created the design or by other participants in the development process such as a quality manager.

Test strategy definition task 430 is directed to defining a test strategy for testing the development result. A test strategy is an investigative approach for identifying if a development result satisfies the requirements and performance characteristics identified in the specification or typically present in products or services of the same type as the development result. A test strategy can include broad descriptions of testing procedures, expected results, and test-related tasks, roles and responsibilities, staffing, scheduling, tools, and environment. These and other components of a test strategy can be assessed in light of their cost, expected information yield, and the requirements and performance characteristics identified in the specification. A test strategy can incorporate and initiate requirement management. Requirement management is an approach to exchanging information to insure that a result meets the requirements and performance characteristics identified in a specification. Using requirement management, effective solutions for meetings requirements can be planned in even complex solutions with multiple components by insuring information exchange between multiple designers using techniques such as impact analysis. A test strategy can also include a result standards plan in which the benchmarks to be achieved by the development result are described.

Test strategy review task 435 is directed to evaluating the test strategy defined in test strategy definition task 430. The test strategy can be evaluated in light of the scope of the development and the estimated effort to be allocated to the development. The test strategy can be used to estimate the resources to be allocated to the development. The test strategy can be reviewed by the parties who created the test strategy or by other participants in the development process such as a quality manager. The test strategy can be used to establish development milestones identifying notable events indicative of progress in the development process.

Specification stage sign-off task 440 is directed to confirming the agreement of the participants in the development process with the reviewed specification, reviewed design, and reviewed test strategy. Once agreement is confirmed, the specification, design, and test strategy can be released to downstream participants in the development project. The agreeing participants can include an external entity such as a customer who originally identified and/or qualified the lead that served as the basis for the proposed development result, and the downstream participants can include other members of the development team.

Test and development guide update task 445 is directed to gathering information regarding the specification, the design, and the test strategy into a test and development guide. A test and development guide can be a discrete collection of information such as a document or a machine-readable file that outlines, in general terms, the planned test and development process. The test and development guide can also include a requirements matrix for the development result. The test and development guide can be a discrete collection of information such as a document or machine-readable file and can serve as a comprehensive resource for subsequent development tasks.

FIG. 5 shows a cookbook 500 for managing and representing the design stage of a development and test phase of a development process. Cookbook 500 includes descriptions of an execution monitoring task 505, a scenario design/component architecture creation task 510, a scenario design/component architecture review task 515, a scenario documentation creation task 520, a component design task 525, and a component design review task 530.

Descriptions 505, 510, 515, 520, 525, 530 include identifier 325, one or more objectives 330, one or more inputs 335, and one or more outputs 340. Descriptions 505, 510, 515, 520, 525, 530 can also include identifications of an entity responsible for performing the task, an entity accountable for performance of the task, and instructions, standards, documentation guidelines, and other resources for performing the task (not shown).

Execution monitoring task 505 is directed to project management of the design stage of a development and test phase of a development process. Project management of the design stage includes gathering information for updating design timelines, workloads, expenses, and resources. Execution monitoring task 505 can be performed throughout the design stage to reflect continuous changes and progress in the design. Execution monitoring task 505 can yield various representations of the changes and progress, including comparisons of budgets with expenditures and planned timelines with actual progress.

Scenario design/component architecture creation task 510 is directed to creating a scenario design and component architecture. A scenario design is a framework of an example course of action or events that are representative of a typical deployment of the development result. For example, when the development result is a set of machine-readable instructions for performing operations, a scenario design can be used to define the output of the instructions with a particular set of input data. A component architecture is a pictorial representation of the framework of the components constituting the development result. A component architecture can describe the functionality of the different components as well as the nature of interfaces between components. For example, when the development result is a set of machine-readable instructions for performing operations, a component architecture can describe the type and format of information that is to be exchanged between components, as well as the techniques and protocols used to perform the exchange. Together, the scenario design and component architecture can be used to ensure that the development result provides the designed function and structure at the component level. The scenario design and component architecture can include technical documentation and development standards. The description of the development result can also include a technical prototype of the development result. The description can also include a description of the interfaces between components. The description can be revised during the implementation stage of the development and test phase. The specification can be amended using change management techniques to reflect the updates to the desired performance characteristics of the development result. The complexity and risk associated with a design can be reassessed in light of the scenario design and component architecture.

Scenario design/component architecture review task 515 is directed to validating the completeness and accuracy of scenario design and component architecture created in scenario design/component architecture creation task 510 and to identifying open issues that remain unresolved in the scenario design and component architecture. The scenario design and component architecture can be reviewed by the creating parties or by other participants in the development process.

Scenario documentation creation task 520 is directed to documenting the scenario design. The scenario design can be documented at the component-level. In other words, the behavior of components of the development result during actions or events of representative of a typical deployment can be described. The scenario documentation can be translated into other languages, as needed.

Component design task 525 is directed to designing the components described by the component architecture created in scenario design/component architecture creation task 510. Component design can include identifying the structure and function of components to be used to implement the design result. The component designs can be rough in that they lack detail necessary to fabricate the components, or the component designs can be sufficiently detailed to allow fabrication of the components. The component design process may identify preexisting or standard components that can be reused. For example, when developing machine-readable instructions for performing operations, the preexisting components may include software modules developed for other purposes. Component design can include refining the design of interfaces between components. For example, when developing machine-readable instructions for performing operations, component design can include the design of a user interface. Component design can include prototyping a component. Component designs, and the decisions made and factors weighed in arriving at the component designs, can be documented and stored for reference, e.g., in machine-readable format. The specification can be amended using change management techniques to reflect the updates to the desired performance characteristics of the development result.

Component design review task 530 is directed to validating the completeness and accuracy of the component designs created in component design task 525 and to identifying open issues that remain unresolved in the component designs. Component designs can be validated by ensuring that a component design fulfills the requirements and desired performance characteristics included in the specification, by ensuring that a component design is feasible, and by ensuring that a component design is supported by participants in the development process. The component designs can be reviewed by the creating parties or by other participants in the development process. The component designs can be reviewed by participants with specialized knowledge regarding the structure or performance of a particular component. For example, when developing machine-readable instructions for performing operations, a component design review for a user interface can be conducted by an expert in user interfaces.

FIGS. 6A, 6B, and 6C show a cookbook 600 for managing and representing the implementation stage of a development and test phase of a development process. Cookbook 600 includes descriptions of an execution monitoring task 605, a kickoff implementation task 610, a test catalogue creation task 615, an implementation task 620, a test catalogue review task 625, a test readiness confirmation task 630, a development testing task 635, a supplemental testing task 640, a result freeze task 645, a module integration testing task 650, a technical specification creation task 655, a technical specification review task 660, a test systems and tester preparation task 665, a user documentation task 670, a component assembly task 675, a master guide update checklist task 680, a test readiness confirmation task 685, and an implementation result to test transfer task 690.

Descriptions 605, 610, 615, 620, 625, 630, 635, 640, 645, 650, 655, 660, 665, 670, 675, 680, 685, 690 include identifier 325, one or more objectives 330, one or more inputs 335, and one or more outputs 340. Descriptions 605, 610, 615, 620, 625, 630, 635, 640, 645, 650, 655, 660, 665, 670, 675, 680, 685, 690 can also include identifications of an entity responsible for performing the task, an entity accountable for performance of the task, and instructions, standards, documentation guidelines, and other resources for performing the task (not shown).

Execution monitoring task 605 is directed to project management of the implementation stage of a development and test phase of a development process. Project management includes gathering information for updating implementation timelines, workloads, expenses, and resources. Execution monitoring task 605 can be performed throughout the implementation stage to reflect continuous changes and progress in the implementation process. Execution monitoring task 605 can yield various representations of changes and progress in the development and development result, including comparisons of budgets with expenditures and planned timelines with actual progress.

Kickoff implementation task 610 is directed to communicating development guidelines, design, and standards to participants in the implementation stage of the development process. This insures that participants in the implementation stage are prepared for their role in the development process. The development guidelines, design, and standards can be found in and/or can include existing documentation such as a specification, a scenario design, a component architecture, and a component design. Kickoff implementation task 610 can also include the commencement of implementation of the designed result and components.

Test catalogue creation task 615 is directed to the creation of a test catalogue. A test catalogue outlines, in relatively detailed terms, the planned test process to implement a test strategy for identifying if a development result satisfies certain requirements and performance characteristics. The planned test process of the test catalogue can be related to probing the result and components of the result. For example, the test catalogue can describe the execution of a particular test directed to proving the adequacy of a particular component design. The detailed terms of the test catalogue can be organized as discrete test cases that can be performed independently. The test catalogue can also describe the administration of tests, the sequence of tests, naming conventions for the tests and test elements such as test results, and documentation regarding the test cases. The test catalogue can be reviewed to insure that it is in accordance with the test strategy. The test catalogue can include one or more preexisting test cases. To create a test catalogue that includes preexisting test cases, preexisting test cases can be reviewed and relevant preexisting test cases selected. The selected preexisting test cases can be supplemented as appropriate. The test catalogue can also include new test cases. The test catalogue can be a discrete collection of information such as a document or a machine-readable file.

Implementation task 620 is directed to implementing and checking a development result. The process for implementing of a result can be highly dependent on the nature of the result. For example, if the result is a tangible product, the implementation of the result can be the realization and assembly of the components of the result. As another example, if the result is machine-readable instructions for performing selected operations, the implementation of a result can include coding and compiling the instructions, as well as implementing data objects, associated machine-readable instructions, header files, make files, binary files, scripts, elements of a user interface, and a draft version of documentation such as the online help. The implemented result can be reviewed in light of relevant standards and the characteristics typically present in products or services of the same type as the development result. Information describing the development activities can be updated during implementation. For example, the development plan can be revised or development activities can be rescheduled based on the progress of implementation. The updates to the development activities description can provide a confirmation of actual and remaining work in the development and the extent to which implementation activities have been completed. A draft version of documentation for the result can also be created.

Test catalogue review task 625 is directed to evaluating the test catalogue created in test catalogue creation task 615. The test catalogue can be evaluated in light of the implementation of the development result, test requirements in the test strategy, and the intended functionality of the result The evaluation of the test catalogue can include a finalization of test cases constituting the test catalogue. The evaluation of the test catalogue can identify open action items to be resolved at a later time. The evaluation of the test catalogue can be performed by the creators of the test catalogue alone or in conjunction with other participants in the development process such as a customer who contracted for the development result. The outcome of the test catalogue review can be documented. For example, if the test catalogue is evaluated in conjunction with a customer, the customer's acquiescence to the test catalogue can be documented.

Test readiness confirmation task 630 is directed to confirming that test resources, including personnel and test equipment, are scheduled and available for performing tests. Tests can be modified or rescheduled if applicable resources are not available. The availability of resources can be monitored over extended periods as a series of tests is performed.

Development testing task 635 is directed to performing development tests. Development tests are tests directed to identifying if the implemented result is capable of meeting development requirements and design criteria, such as those described in a specification. Development tests can include automated tests conducted without user input and manual tests conducted with user input. Automated tests can be completed before manual tests begin. Development tests can be run iteratively with refinement of the implementation of the result. For example, if an automated test identifies a problem with the implementation, the implementation can be refined and the automated test repeated. If the development result is machine-readable instructions for performing operations, the development tests can include source code reviews and tests of individual functionality of different components of the instructions. The results of development tests can be used to update the documentation of the development result. For example, if the tested development result exceeds certain performance criteria, this can be noted in the specification.

Supplemental testing task 640 is directed to performing tests that are outside the scope of identifying if the implemented result is capable of meeting development requirements and design criteria. Instead, supplemental tests may be used to identify technical properties of the development result that are typically present in products or services of the same type as the development result. For example, if the development result is machine-readable instructions for performing operations, the supplemental tests may include an upgrade test to determine if the instructions are amenable to use in upgrading existing instructions, a performance test to determine the performance characteristics of the machine-readable instructions, and a usability test to determine if the instructions interface acceptably with users.

Result freeze task 645 is directed to limiting further change of the result to allow consolidation of the development result and its associated documentation into a coherent whole. In particular, further development of the development result can be limited. The manner in which change is limited can depend upon the nature of the development result. For example, if the development result is machine-readable instructions for performing operations, then different limitation stages can be used. For example, prior to result freeze task 645, almost no limitations on refinement need apply. After result freeze task 645, only corrections of errors in the instructions may be allowed. Alternatively, other corrections such as those directed to improving performance or reducing lines of code. Special rules and procedures for further development of the result after result freeze task 645 can apply.

Module integration testing 650 is directed to validating that the components of the implemented development result function as an integrated whole. The component validation can include a validation of the function of interfaces between components. The component validation can include additional tests. The tests can be performed iteratively with the correction of errors in the result. The component validation can identify any remaining issues in the development and provide an indication of the degree of completion of implementation and development activities.

Technical specification creation task 655 is directed to the creation of a technical specification. A technical specification is a collection of detailed technical documentation describing the development result. The technical specification can include information relating to maintenance, installation, or the development of custom features for the development result. The technical specification can be prepared for internal users or external users such as customers or clients who use the development result. The technical specification can include an assessment of the correlation between the implemented development result and any requirements or design characteristics of the development result. The technical specification can also include highlights of advantageous aspects of the development result, for use in selling the development result.

Technical specification review task 660 is directed to validating the correctness and completeness of the technical specification created in technical specification creation task 655. Validating the technical specification can include checking the accuracy of information in the technical specification, as well as proofing the technical specification for readability. Validating the technical specification can also include assessing the advantages of the development result and the fulfillment of the development objectives, including the result requirements and design characteristics.

Test systems and tester preparation task 665 is directed to preparing test systems and participants for an acceptance test. An acceptance test can be a series of tests designed to probe different aspects of the implemented result. For example, when the development result is machine-readable instructions for performing operations, the acceptance test can include a system test designed to probe the operations resulting from performance of the instructions, an integration test designed to probe the coordination between the operations and other data processing activities, a scenario integration test designed to probe the operations resulting from performance of the instructions within the constraints of a framework of an example course of action or events that are representative of a typical deployment of the development result, a regression test designed to assess the impact of changes to the result instructions by repeating a previously executed test, a re-test designed to confirm the accuracy of the results from a previously executed test, a performance test designed to benchmark the capabilities of the result instructions, and an upgrade test designed to determine if the instructions are amenable to use in upgrading existing instructions.

The preparation of resources in task 665 can include testing the development result in a model environment. The environment can be modeled on the environment in which the development result is intended to operate. For example, when the development result is machine-readable instructions for performing operations, a model environment can be a system landscape in which the customization of data is the same as in a landscape in which the development result is intended to operate.

The preparation of resources in task 665 can also include developing tools that enable the development result to operate in the environment in which the development result is intended to operate. For example, when the development result is machine-readable instructions for performing operations, these tools can include system administration elements such as defining various authorizations for performing selected operations with the machine-readable instructions (e.g., template users, administrative users, test users), defining the application program interface (API) (e.g., defining remote function call (RFC) destinations), and defining customization of data and master data for the system landscape in which the development result is intended to operate.

The preparation of test systems and testing participants can also include informing test participants about the development result and the test procedures used to test the development result. For example, test participants can be assigned to particular tests or test areas, test participants can be assigned authorizations, equipment, and workspaces, and test participants can begin training on test tools and project procedures.

User documentation task 670 is directed to developing and recording information relevant to the user of the development result. The developed information can omit technical details included in the technical specification and instead be directed to providing an easy guide to applying the development result. The user information can be developed by redacting other documentation such as the technical specification or by providing a brief description of common applications of the development result. The information can be recorded in a user's guide or other discrete collection of information such as a document or a machine-readable file. The user documentation can be translated into different languages as appropriate.

Component assembly task 675 is directed to constructing a final assembly of the components of the development result. The final assembly can be tested for maintainability or in other tests, including an acceptance test. The final assembly can also be probed in an upgrade test to determine if the final assembly is amenable to use in upgrading existing equipment.

Master guide checklist update task 680 is directed to updating the master guide checklist. The master guide checklist is a description of a series of items that are to be specified in order to detail the operating environment and constraints of the development result. For example, when the development result is machine-readable instructions for performing operations, the master guide checklist can detail the system environment in which the result instructions are to operate. Updating the master guide checklist can also provide a assessment of the complexity and risk associated with the development result.

Test readiness confirmation task 685 is directed to ensuring that the implementation is ready for the next series of tests.

Ensuring that the implementation is ready for the next series of tests can include confirming the sufficiency of documentation and previous test results by reviewing the documentation and previous test results and supplementing/correcting the documentation and previous test results as needed. When the sufficiency of documentation and previous test results is in doubt, development participants who are responsible or accountable for the documentation and previous test results can be contacted and questioned. This can include holding a pre-test meeting where deviations in the documentation and previous test results, as well as any corrective action taken or needed, are discussed amongst development participants. These discussions can be documented and used as the basis for subsequent documentation regarding the development process.

Ensuring that the implementation is ready for the next series of tests can also include generating a test readiness review. A test readiness review is an appraisal of the sufficiency of existing documentation and previous test results. The test readiness review can be a discrete collection of information such as a document or a machine-readable file. Such a document can include a maturity report. A maturity report is a collection of criteria for ending the development and test phase of a development process, along with an assessment of how the existing documentation and previous test results meet those criteria.

Implementation result to test transfer task 690 is directed to transferring the development result, and existing documentation, to the test stage of the development and test phase of the development process. The transfer can include handing over the development result, test results, development documentation, and development analyses to participants in the test stage. The transfer can also initiate procedures and techniques associated with the test stage. For example, the transfer can include a development freeze. A development freeze is a type of result freeze, in that further development of the existing implementation of the development result is halted in the development system. A copy of the development result is transported to a test system where the development result is tested to ensure that the technical requirements of the development result were met. As another example, if product lifecycle management (PLM) software is being used to manage the development process, then the transfer can also include switching to a scenario phase of the software.

FIGS. 7A and 7B show a cookbook 700 for managing and representing the test stage of a development and test phase of a development process. Cookbook 700 includes descriptions of an execution monitoring task 705, an acceptance test kick-off task 710, an error correction task 715, an acceptance testing task 720, a result documentation review task 725, an emergency correction task 730, a test report creation task 735, and a handover task 740.

Task descriptions 705, 710, 715, 720, 725, 730, 735, 740 include identifier 325, one or more objectives 330, one or more inputs 335, and one or more outputs 340. Descriptions 705, 710, 715, 720, 725, 730, 735, 740 can also include identifications of an entity responsible for performing the task, an entity accountable for performance of the task, and instructions, standards, documentation guidelines, and other resources for performing the task (not shown).

Execution monitoring task 705 is directed to project management of the test stage of a development and test phase of a development process. Project management includes gathering information for updating test timelines, workloads, expenses, and resources. Test monitoring task 705 can be performed throughout the test stage to reflect continuous changes and progress in the test stage. Test monitoring task 705 can yield various representations of the changes and progress, including comparisons of budgets with expenditures and planned timelines with actual progress.

Acceptance test kickoff task 710 is directed to communicating the guidelines, goals, and standards of the acceptance test to participants in the acceptance test. This insures that participants in the acceptance test are prepared for their role in the acceptance testing. The acceptance test guidelines, goals, and standards can be found in and/or can include existing documentation such as a test readiness review, a maturity report, a test plan, and a test catalogue. Acceptance test kickoff task 710 can also include the commencement of acceptance testing of the implemented result.

Error correction task 715 is directed to initiating the next level of consolidation of the implemented result and its associated documentation into a coherent whole. In particular, further development of the implemented result can be limited. The manner in which development if limited can depend upon the mature of the development result. For example, prior to error correction task 715, only corrections of errors in the implemented result may be allowed, whereas only catastrophic errors may be allowed to be corrected after error correction task 715. Special rules and procedures for further development of the result after error correction task 715 can apply.

Acceptance testing task 720 is directed to the execution of the acceptance test. The acceptance test can be a series of tests designed to probe different aspects of the implemented result. For example, when the development result is machine-readable instructions for performing operations, the acceptance test can include a system test designed to probe the operations resulting from performance of the instructions, an integration test designed to probe the coordination between the operations and other data processing activities, a scenario integration test designed to probe the operations resulting from performance of the instructions within the constraints of a framework of an example course of action or events that are representative of a typical deployment of the development result, a regression test designed to assess the impact of changes to the result instructions by repeating a previously executed test, a re-test designed to confirm the accuracy of the results from a previously executed test, a performance test designed to benchmark the capabilities of the result instructions, and an upgrade test designed to determine if the instructions are amenable to use in upgrading existing instructions.

The acceptance test can be performed in accordance with a test strategy that identifies one or more test cases for probing the implemented result. The acceptance test can be performed in segments. For example, a first segment can involve a subsection of the acceptance test participants, whereas a second segment can involve the full team of acceptance test participants. Acceptance test results can be recorded and reported as appropriate. When the correction of an error is not limited by the consolidation of the development result in the error correction task 715, the error can be corrected and a regression test used to probe the efficacy of the correction. Acceptance testing can provide an assessment of the degree of completion of the development process.

Result documentation review task 725 is directed to ensuring that documentation of the development result is sufficient. Examples of such documentation can include assembly manuals, user guides, user instructions, online help, and user documentation. Such result documentation can be reviewed for accuracy and completeness, for example, by comparing the result documentation with other documentation and test results. The review can include the completion of a document review checklist that identifies result documents and the standards for their completion.

Emergency correction task 730 is directed to rectifying any high priority errors in the implemented development result. A high priority error can be any error that impairs or impedes a desired functionality of the development result to such an extent that delivery of the development result without correction of the error is unacceptable. A high priority error can be first identified by the acceptance test. The correction of a high priority error can be overseen by a development manager. After correction of any high priority errors, the development result can be deliverable to a requesting party.

Test report creation task 735 is directed to creating one or more test reports documenting the results and analyses from the acceptance test. The created test reports can document test results, anomalous conditions encountered during tests along with the steps taken to overcome the anomalous conditions, the correctness of test and test related documentation, the effectiveness of the test processes, the efficiency and thoroughness of testing parties, and the standard of the result under test.

Handover task 740 is directed to preparing and presenting the development result and associated documentation to the participants in the next phase of the development process. For example, the development result can be prepared for presentation to participants in the production phase of a development process or the development result can be prepared for presentation to participants in the delivery and acceptance phase of a development process. Preparing and presenting the development result can include documenting any open issues with the development, determining a response to an open issue, assigning participants to address or monitor an open issue, reviewing the completeness of a bill of materials or other list of components of the development result, confirming that the listed components are included in the development result, and scheduling a handover meeting where the development result is delivered and one or more test reports are presented. Handover task 740 can also include a review of a production validation plan for validating the production of the development result. A production validation plan is a strategy for testing the development result to ensure that the result meets certain requirements.

Figure 8B:
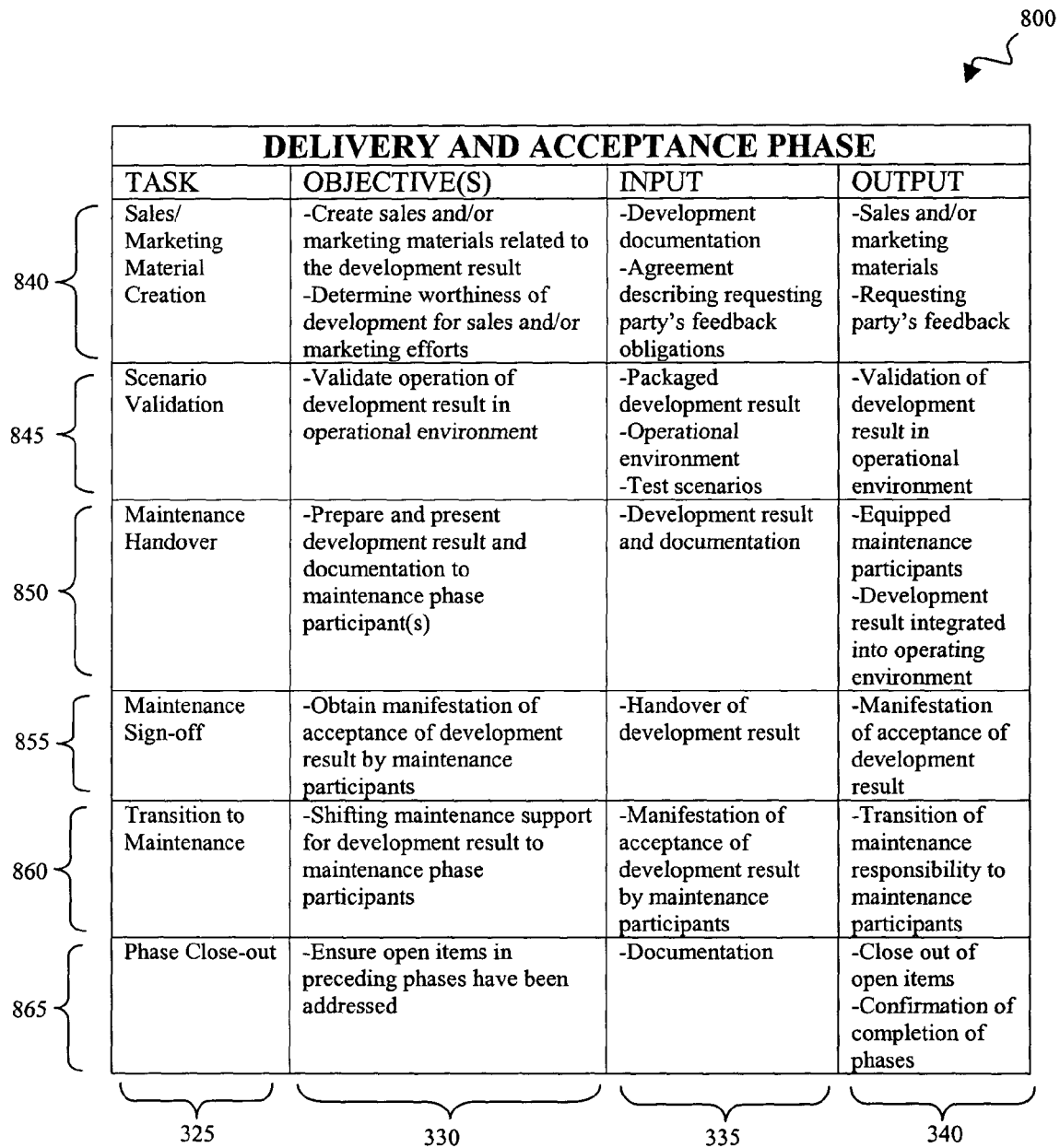
Figure 8C:
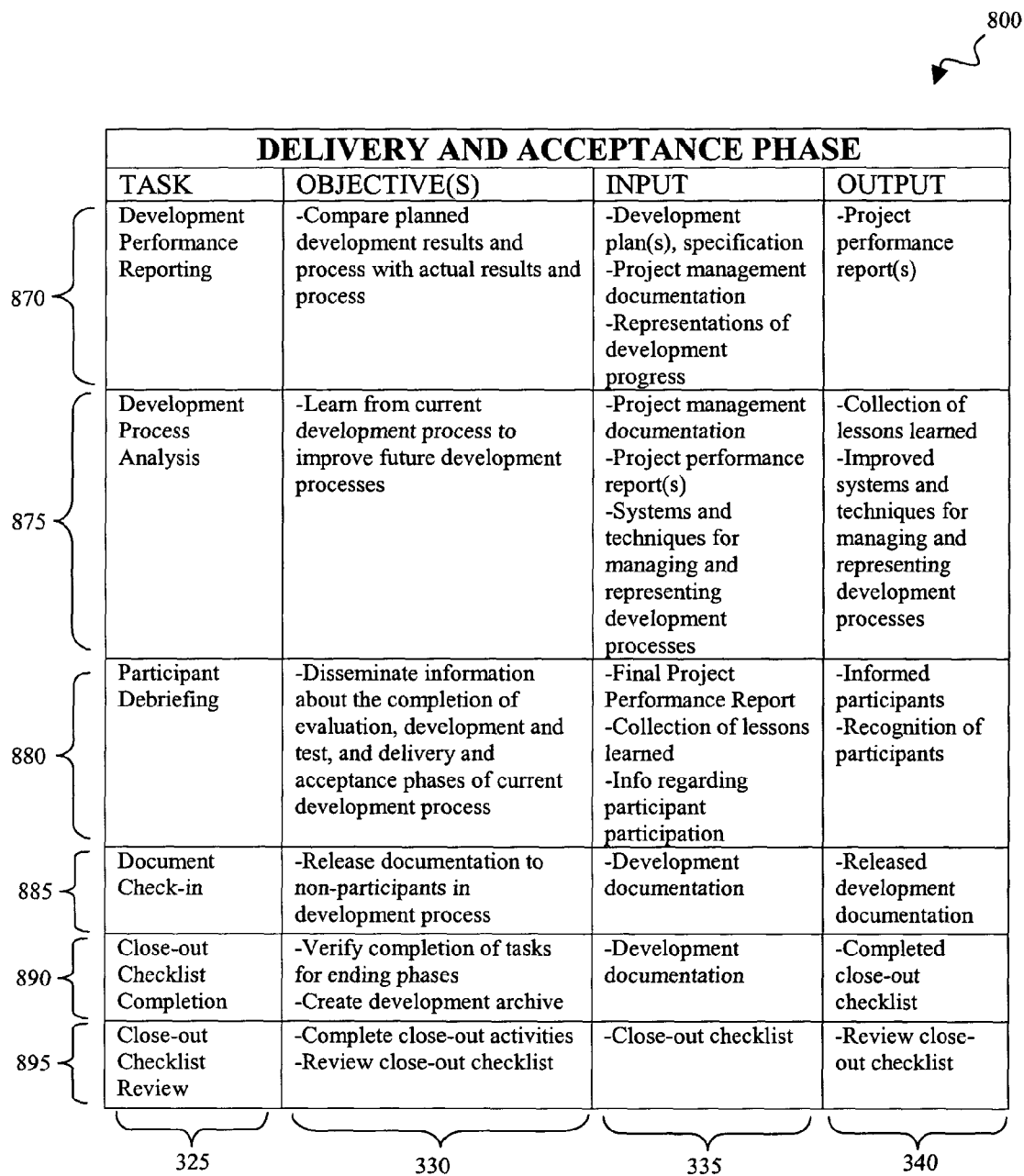

FIGS. 8A, 8B, and 8C show a cookbook 800 for managing and representing the delivery and acceptance phase of a development process. Cookbook 800 includes descriptions of a delivery and acceptance phase initiation task 805, an execution monitoring task 810, a handover receipt task 815, a development result distribution task 820, a development result distribution validation task 825, a sign-off task 830, a warranty obligation fulfillment task 835, a sales/marketing material creation task 840, a scenario validation task 845, a maintenance handover task 850, a maintenance sign-off task 855, a transition to maintenance task 860, a phase close-out task 865, a development performance reporting task 870, a development process analysis task 875, a participant debriefing task 880, a document check-in task 885, a close-out checklist completion task 890, and a close-out checklist review task 895.

Task descriptions 805, 810, 815, 820, 825, 830, 835, 840, 845, 850, 855, 860, 865, 870, 875, 880, 885, 890, 895 include identifier 325, one or more objectives 330, one or more inputs 335, and one or more outputs 340. Descriptions 805, 810, 815, 820, 825, 830, 835, 840, 845, 850, 855, 860, 865, 870, 875, 880, 885, 890, 895 can also include identifications of an entity responsible for performing the task, an entity accountable for performance of the task, and instructions, standards, documentation guidelines, and other resources for performing the task (not shown).

Delivery and acceptance phase initiation task 805 is directed to preparing for the delivery and acceptance phase. This preparation can include a review and modification of existing development documentation, deliverables, participants, and participant roles to ensure readiness for the delivery and acceptance phase. Existing development documentation can include, e.g., a project plan, a risk management plan, a specification, a technical specification, development management documents, and a development agreement.

Preparation for the delivery and acceptance phase can also include preparing the participants in the delivery and acceptance phase, e.g., by presenting the participants and the party who requested the development with an overview of the delivery and acceptance phase. The overview can include phase deliverables and target dates.

Execution monitoring task 810 is directed to project management of the delivery and acceptance phase. Project management of the delivery and acceptance phase can include gathering information for updating delivery and acceptance timelines, workloads, expenses, and resources. Execution monitoring task 810 can be performed throughout the delivery and acceptance phase to reflect continuous changes and progress in the phase. Execution monitoring task 810 can yield various representations of the changes and progress, including comparisons of budgets with expenditures and planned timelines with actual progress.

Handover receipt task 815 is directed to receiving the development result and associated documentation from the participants in the development and test phase. The development result and associated documentation can be evaluated for completeness and accuracy and a list of the items that are to be delivered to the party who requested development can be formed. For example, when a customer requests the development of a custom set of machine-readable instructions for performing operations, the deliverable list can identify software products, services, and documentation to be provided to the customer.

Development result distribution task 820 is directed to transferring the development result to the requesting party. The development result can be packaged and distributed as appropriate. For example, when the development result is machine-readable instructions for performing operations, the development result can be tangibly embodied in an information carrier (such as a data diskette or compact disk), packaged, and shipped to the requesting party, or the development result can be electronically transferred over a data connection to the requesting party. As another example, when machine-readable instructions are developed on-site at the requesting party's delivery location, the instructions can be released for use by the requesting party. The distribution of the development result can be documented. For example, shipping records or a bill of lading can document the distribution.

Development result distribution validation task 825 is directed to confirming that the party who requested the development has indeed received the development result after development result distribution task 820. Confirming the receipt of the development result can include notifying the receiving party of the delivery of the development result, tracking delivery of the development result by a carrier, confirming a transfer of data to the receiving party, or requesting a written confirmation of receipt from the receiving party.

Sign-off task 830 is directed to obtaining a manifestation of the acceptance of the development result by the party who requested development. A manifestation of acceptance can include the requesting party's signature on a specialized acceptance form. Such a manifestation of acceptance (i.e., a sign-off) can have a legal significance such as setting a due date for payment for the development of the result.

Warranty obligation fulfillment task 835 is directed to meeting any remaining warranty obligations to the party who requested development. The warranty obligations can be defined by an agreement between the developing party and the party who requested the development. For example, the obligations can be defined through a contractual agreement between a product developer and a customer. The warranty obligations can be limited in time or in scope. For example, the warranty obligations can exist only during a warranty period and can be limited to certain aspects or uses of the development result. The receipt of a manifestation of acceptance to the development result can initiate such a warranty period. The scope of the warranty can also be limited to the correction of material defects in the development result. A material defect is a defect that seriously interrupts normal operations of the development result. For example, when the development result is machine-readable instructions for performing operations, a material defect can be the unavailability or a serious malfunction of a functional requirement identified in the specification.

Sales/marketing material creation task 840 is directed to creating sales and/or marketing materials related to the development result. Sales and marketing materials can include sales brochures, a "Project Success Story" describing the successful development process, and advertising relating to the development result. The creation of such materials can include presenting details regarding the development process and development result to sales and/or marketing specialists (such as an internal sales and/or marketing department or an external sales and/or marketing agency) and allowing the specialists to author the materials. Such specialists can also be introduced to the party who requested development to obtain the requesting party's feedback, such as a quote or a public testimonial regarding the success of the development. The requesting party's feedback can be within the scope of a negotiated agreement for development of the result. The creation of sales/marketing materials can also include determining whether or not the development is to be the subject of sales and/or marketing efforts. For example, a development result can be classified as successful and worthy of marketing and/or sales efforts, successful and unworthy of marketing and/or sales efforts, or unsuccessful and unworthy of marketing and/or sales efforts.

Scenario validation task 845 is directed to validating the operation of the development result in a particular environment in which the development result is intended to operate. For example, when the development result is machine-readable instructions for performing operations, the operational environment includes a system landscape and the customization of data in the landscape. A system landscape is arrangement of components and their interconnections for data processing activities. A system landscape can be tailored for specific functions, processes, relationships between processes, types of information exchange, and control relationships. A system landscape can include a physical arrangement of entities (such as hardware and software), process allocation amongst the entities, communication protocols and devices for information exchange between the entities, and information structuring and management techniques.

The customization of data in a landscape tailors the representation of information in data variables to a specific purpose. The customization of data in a system can be selected by a user to meet the specific requirements of a customer. Data can be customized to the context in which the data is to be used or to meet the purpose for which the data is to be used. For example, the format of data variables in a system may be tailored to meet the requirements of a particular country, a particular industry, a particular company, or a particular department or site in a company to accurately fulfill even specialized or localized needs. Examples of data customization include language customization, unit customization (e.g., metric versus English), format customization (e.g., month/day/year versus day/month/year), and notation customization (e.g., representing an employee's gender as male/female versus M/F versus 0/1).

The validation can be performed using a series of tests performed in a framework of an example course of action or events that are representative of a typical deployment of the development result. Validating the operation of the development result in these scenarios can include installing the development result in the environment and performing the predefined operations with the installed result. Validating the operation of the development result can also include monitoring another party's operation of the development result and/or correcting defects that arise in the operational environment. When the development result is machine-readable instructions for performing operations, validating the development result can include monitoring the installation of the instructions, monitoring the preparation of the instructions for the system configuration and test data, and monitoring the execution of test cases on the instructions.

Maintenance handover task 850 is directed to preparing and presenting the scenario-validated development result and associated documentation to the participants in the maintenance phase. Preparing and presenting the validated development result can include the preparation of support infrastructure, the operating environment, and integration of the development result into the operating environment. The presented documentation can include technical documentation (such as an installation guide or an upgrade guide) and nontechnical documentation (such as a user guide or training materials). The presented documentation can also include review and training sessions for the maintenance phase.

Presenting the validated development result can also include assessing the readiness of the maintenance phase participants to perform tasks in the maintenance phase. Aspects of maintenance handover task 850 can be specified in an agreement between the party who requested the development and the party who designed, implemented, and delivered the development. For example, aspects of maintenance handover task 850 can be specified by an external customer who requests the development of a particular result and who intends to perform tasks in the maintenance phase. The specified aspects can include one or more of the timing and scope of maintenance handover task 850 and the results and documentation to be presented during maintenance task 850.

Maintenance sign-off task 855 is directed to obtaining a manifestation of the acceptance of the development result by the participant(s) in the maintenance phase. A manifestation of acceptance can include a maintenance phase participant's signature on a specialized acceptance form.

Transition to maintenance task 860 is directed to shifting support for the development result to the maintenance phase participants. Shifting the maintenance support can include a gradual shift in responsibility or a sharp transition in responsibility to the maintenance phase participants. A sharp transition can be demarcated by an email, meeting, or conference call where responsibility is entirely transferred.

Phase close-out task 865 is directed to ensuring that open items in the preceding evaluation, development and test, and delivery and acceptance phases have been addressed. One item that may be addressed during phase close-out task 865 is ensuring that the outcomes of one or more of the evaluation, development and test, and delivery and acceptance phases are captured. Capturing the outcomes of a phase can include gathering, verifying, and documenting performance during a phase, analyses of the effectiveness of the development process in a phase, and lessons learned during a phase. The outcomes can be archived for reference.

Development performance reporting task 870 is directed to comparing the planned development results and development process with the actual development results and process. The comparison between the planned and actual results and process can be summarized in one or more documents hereinafter referred to as a project performance report. The project performance report can compare key parameters of the planned development and the actual development. These parameters include development cost, development revenue/funding, development schedule, and development effort (e.g., person-days). The planned values, the actual values, and the variances of these and other such parameters can be included in a project performance report.

Development process analysis task 875 is directed to analyzing the current development process so that future development processes can be improved. For example, a participant on the current development process can analyze the current development process and gather a collection of lessons learned from the current development process. The collection can be stored for access by participants in future development processes or the collection can be used to update or modify systems and techniques for managing and representing development processes. The collection can include lessons relating to project management, change management, scheduling, cost control, quality assurance testing, and/or quality audits of a development process.

Participant debriefing task 880 is directed to disseminating information about the completion of the preceding evaluation, development and test, and delivery and acceptance phases to participants in those phases. Disseminated information can include development accomplishments, development indicators, lessons learned, and other topics as appropriate to the development participants. Such completion information can be disseminated at a formal meeting of participants. The participant meeting can include ritualistic recognition of participation in the development process through the distribution of small gifts or certificates to participants.

Document check-in task 885 is directed to archiving documentation of the development result and development process. The documentation can be archived in a central repository. The archived documentation can be released to individuals who did not participate in the development process. Such non-participants can be individuals who participated in activities that are related to the development process but not part of the process itself. For example, a sales department or a marketing department can sell or market the development result without participating in the development process. As another example, a legal department can copyright development documentation or apply for patent or trademark protection for the development result without participating in the development process.

Close-out checklist completion task 890 is directed to verifying that a group of close-out tasks for ending the preceding evaluation, development and test, and delivery and acceptance phases have been completed. The tasks for ending the preceding phases can include a review of the completion/delivery of development deliverables, a verification of sales and/or marketing efforts, a release of project resources (including equipment and personnel) to other development efforts, a notification of non-participating personnel such as an accounting department, a verification that a participant debriefing occurred, performance feedback and performance evaluations of development participants, planning for resolution of outstanding issues, end-of-phase reviews, and the creation of a development archive. The development archive can include a completed close-out checklist, as well as other deliverables and records.

Close-out checklist review task 895 is directed to confirming the completion of any open close-out activities through a review of the close-out checklist. The open activities can be those identified in close-out checklist completion task 890. The review of the close-out checklist can include a validation of the completeness and accuracy of the close-out checklist. The close-out checklist can be reviewed by the parties who completed the close-out checklist or by other participants in the development process.

FIG. 9 shows a cookbook 900 for managing and representing the production and assembly stage of maintenance phase of a development process. Cookbook 900 includes descriptions of a handover task 905, a prototype assembly task 910, a prototype validation in reference environment task 915, a prototype validation in different environment(s) task 920, an installation guide creation task 925, an assembly/validation status reporting task 930, a project management task 935, a development result production task 940, a prototype validation reporting task 945, and a handover task 950.

Task descriptions 905, 910, 915, 920, 925, 930, 935, 940, 945, 950 include identifier 325, one or more objectives 330, one or more inputs 335, and one or more outputs 340. Descriptions 905, 910, 915, 920, 925, 930, 935 940, 945, 950 can also include identifications of an entity responsible for performing the task, an entity accountable for performance of the task, and instructions, standards, documentation guidelines, and other resources for performing the task (not shown).

Handover task 905 is directed to receiving the development result and associated documentation from the participant(s) in the development process who are responsible for the development and testing phase of the development process. The development result and associated documentation can be received by participants responsible for the production and assembly of the development result. Production of the development result can include the manufacture of multiple copies of the development result. The manufactured copies can be operable in different operating environments than the operating environment(s) in which the development result was produced and/or tested. The manufactured copies can thus differ from the development result.

Handing the development result over can include holding a handover meeting where the development result and associated documentation are presented and discussed. The worthiness and timing for production of the development result can be determined during handover task 905. The development result and documentation can be prepared and presented at the component level. For example, a master list of the components of the development result can be prepared and presented. Test results can also be prepared and presented. Handover task 905 can also include the preparation and presentation of production validation plan results to the participants in the development process who are responsible for producing and assembling the development result. A production validation plan is a strategy for testing the development result to ensure that the result meets certain requirements. Information regarding the production validation plan and production validation plan results can be received from participants in the development and test phase of the development process.

Prototype assembly task 910 is directed to assembling the components of the development result into a single prototype for use in validating that the development result is to be produced. The assembled components can include preexisting components, such as components of the operating environment. The components can be assembled as received from another stage in the development process or the components can be modified prior to assembly. The prototype can be machine-readable instructions for performing operations. The instructions can include compiled and/or interpreted code in one or more languages. The instructions can also include additional modifications specific to a certain application or operating environment. The assembly of such components can include the creation of tangible embodiments of the machine-readable instructions, such as diskettes or compact disks that include the instructions.

Prototype validation in reference environment task 915 is directed to validating the prototype assembly of components in a reference environment. A reference environment is an operating environment with known properties. One example of a reference environment is a stable system of data processing devices. The prototype can be validated in accordance with a production validation plan established in conjunction with participants in the development and test phase of the development process. Validation of the prototype assembly can include a validation of the core functions of the prototype. Core functions are the operations constituting the primary utility of the development result.

Prototype validation in different environment(s) task 920 is directed to validating the prototype assembly of components in one or more other operating environments. When the development result is a set of machine-readable instructions for performing operations, examples of other operating environments can include different data processing platforms and/or different upgrade releases.

Installation guide creation task 925 is directed to creating an installation guide. An installation guide is a set of user instructions for bringing the development result into an operating environment. An installation guide can also include instructions for upgrading an existing system using the development result. An installation guide can be a discrete collection such as a document or a machine-readable file.

Assembly/validation status reporting task 930 is directed to describing the status of the production and assembly stage. Status reporting can include describing the assembly of the components of the development result and the validation of the assembled prototype. Status reporting can involve project management systems and techniques. For example, status reporting can occur at regular intervals or at specific milestones in the production and assembly stage.

Project management task 935 is directed to ensuring that information generated in the production and assembly stage are gathered and recorded in a project management system. The recorded information can include data regarding the performance of the production and assembly stage, as well as results reported in status reports. The recorded project management information can identify the version of the components assembled and the version of the prototype validated. The project management system can be a project performance management system (PPMS). A PPMS is a system for managing the performance of a managed project. Managing the performance of project can include docketing and following up on delivery dates and acceptance criteria, contractor management, financial reporting, configuration reporting, and test reporting.

Development result production task 940 is directed to producing the development result based on the evaluated prototype. The manner in which the development result is produced can depend upon the nature of the development result. For example, when the development result is machine-readable instructions for performing operations, the development result can be produced by creating tangible embodiments of the instructions such as diskettes, compact discs, or digital video discs.

Producing the development result can also include updating various descriptions of the development result and descriptions of the components of the development result. For example, a bill of materials (BOM) or a material master can be updated to reflect changes. A bill of materials is list of components of the development result, while a material master is a description of a particular component within the bill of materials. Sales and marketing materials, such as a product catalog, can also be updated.

Prototype validation reporting task 945 is directed to describing the validation of the assembled prototype of the development result. The description of the validation can include both the validation results and analysis of the results. For example, the description of the validation can include analysis relevant to making a decision regarding whether or not the development result is to be released and a proposal for the manner in which the release is to be conducted. If it is proposed that the development result is not to be released, this proposal can be reviewed with senior personnel, for example, at an escalation meeting. The description of the validation can also include one or more of a review of the validation results, a summary of open issues, an updated bill of materials, and an expanded production validation plan.

Handover task 950 is directed to preparing and presenting the validated and produced development result and associated documentation to one or more customers and the participant(s) in the development process who are responsible for maintaining the development result. Handing the development result over can include holding a handover meeting where the validated development result and associated documentation are presented and discussed. For example, a validation report can be presented and discussed during such a meeting. Handover task 950 can also include reaching a decision regarding whether or not to release a development result to customers.

FIG. 10 shows a cookbook 1000 for managing and representing the maintenance phase of a development process. Cookbook 1000 includes descriptions of a maintenance scheme establishment task 1005, a monitoring and dispatch task 1010, a problem analysis task 1015, a maintenance activity performance task 1020, a maintenance activity testing task 1025, a maintenance information propagation task 1030, a maintenance instruction generation task 1035, a maintenance event termination task 1040, a maintenance reporting task 1045, a development request evaluation task 1050, and a correction propagation task 1055.

Task descriptions 1005, 1010, 1015, 1020, 1025, 1030, 1035, 1040, 1045, 1050, 1055 include identifier 325, one or more objectives 330, one or more inputs 335, and one or more outputs 340. Descriptions 1005, 1010, 1015, 1020, 1025, 1030, 1035 1040, 1045, 1050, 1055 can also include identifications of an entity responsible for performing the task, an entity accountable for performance of the task, and instructions, standards, documentation guidelines, and other resources for performing the task (not shown).

Maintenance scheme establishment task 1005 is directed to establishing the mechanisms for maintenance of the development result. The mechanisms can include both the physical allocation of maintenance resources and the organizational structure (such as roles and responsibilities) of maintenance phase participants. The mechanisms can be established based upon predictions of the frequency of maintenance events and experience regarding the efficacy of resources and personnel. For example, a formal dispatching mechanism or an informal queue can be established. A formal dispatching mechanism includes the direction of incoming requests for maintenance to a specific maintenance phase participant. An informal queue includes the placement of incoming requests for maintenance into a queue and first-in-first-out retrieval by the next available maintenance phase participant.

Monitoring and dispatch task 1010 is directed to monitoring maintenance events and dispatching personnel and resources to maintain the development result. Maintenance events are occasions when activity by the maintenance phase participants is required. Example maintenance events include scheduled and unscheduled maintenance activities and requests for maintenance by a party who deploys the development result. Requests for maintenance can be added to a queue in a maintenance system, and dispatched as appropriate. Maintenance events can be monitored using project management techniques that record the frequency and nature of events, as well as the resources used to respond to events. For example, the dispatch of personnel and resources can be monitored using project management techniques.

Problem analysis task 1015 is directed to investigating and classifying a maintenance event and identifying a maintenance activity that responds to the event. Examples of responsive maintenance activities include both scheduled and unscheduled maintenance and replies to requests for maintenance with an estimated time until maintenance can occur or with workarounds to minimize the urgency of the requested maintenance. When the maintenance event is a request for maintenance, the request can first be classified as either a custom request or a standard request. Custom requests relate to a specific aspect of the development or development result. Standard requests are largely independent of the development or development result. For example, if a customer requests the development of machine-readable instructions for importing a certain class of data objects into an existing program, maintenance requests relating to the importation of the data objects are custom requests whereas maintenance requests relating to the operation of the existing program are standard requests. Custom requests can be analyzed by maintenance participants who have received information regarding the development or development result, whereas standard requests can be analyzed by those who have not received such information. Maintenance participants can investigate both the reasons for a maintenance request and the appropriate response to a maintenance request. The response to a maintenance request can be generic to different applications of the development result operating in different environments.

Maintenance activity performance task 1020 is directed to performing responsive maintenance activities identified in problem analysis task 1015. Responsive maintenance activities can include modification or redesign of the development result, as appropriate, as well as technical and non-technical documentation of such changes. When the development result is machine-readable instructions for performing operations, responsive maintenance activities can include corrective measures to insure that the instructions offer a certain desirable functionality. The correction of machine-readable instructions can be corrections to interpreted code in script languages or corrections to source code, followed by compiling and distribution of the resultant object code. The correction of machine-readable instructions can be performed at a site where the instructions are deployed or at the development site and later delivered to the deployment site.

Maintenance activity testing task 1025 is directed to assessing the efficacy of a maintenance activity such as that performed in maintenance activity performance task 1020. The efficacy of a maintenance activity can be assessed against standards for performance of the activity and in light of reasons for the maintenance event. For example, when the development result is machine-readable instructions for performing operations, the efficacy of a maintenance activity such as a code correction can be assessed using the "four-eyes" principle and code inspection, version comparison, and functional testing techniques. The results of maintenance activity testing task 1025 can be documented.

Maintenance information propagation task 1030 is directed to proliferating information regarding an effective maintenance activity to other parties who may be interested in the activity. For example, information regarding a maintenance activity can include a description of the symptoms or problem that gave rise to the maintenance event, a description of the cause of the symptoms or problem, and a description of a solution responsive the symptoms or problem. These descriptions can be generic to different applications of the development result operating in different environments. Information regarding a maintenance activity can be proliferated by documenting the maintenance activity and distributing the documentation as appropriate. For example, when the development result is machine-readable instructions for performing operations and the maintenance activity is a software patch, a brief description of the problem necessitating the patch can be posted to a web site as notes and made available to others who may deploy the development result.

Maintenance instruction generation task 1035 is directed to generating instructions for the performed maintenance activity. The instructions can be associated with a tool for performing the maintenance activity. For example, when the development result is machine-readable instructions for performing operations, instructions for installing a software patch can be associated with the software patch.

Maintenance event termination task 1040 is directed to signaling the resolution of a maintenance event to the party who requested the maintenance. The resolution of a maintenance event can be signaled by removing a maintenance event from a maintenance schedule or by returning a maintenance request with an indication that responsive maintenance activities have been performed. For example, a message from a customer requesting maintenance can be closed and returned to the customer with a note indicating that responsive maintenance activities have been performed.

Maintenance reporting task 1045 is directed to informing one or more maintenance participants about the resolution of a maintenance event. For example, project management techniques can be used to record the completion of a maintenance event. This recording can be accessible to maintenance participants in the form of maintenance reports used to monitor the maintenance phase of the development process.

Development request evaluation task 1050 is directed to evaluating a request by a party who deploys a development result for additional development of the development result. The additional development can include the addition of new property to the development result or a refinement of an existing property of the development result. The request for additional development can be evaluated using systems and techniques described in regard to the evaluation phase of a development process. For example, cookbook 300 for managing and representing the evaluation phase of a development process can be used to manage and represent a process performed in development request evaluation task 1050. The evaluation of the development request can be performed by the same or similarly trained participants who evaluated the original request for development of the development result. If the additional development is found to be qualified for development, the additional development can be developed, for example, using the systems and techniques described herein.

Correction propagation task 1055 is directed to proliferating the maintenance activity itself to others who deploy the development result and may be interested in the maintenance activity. The maintenance activity can be proliferated by distributing the maintenance activity in the same manner that the distribution result was distributed. For example, when the development result is machine-readable instructions for performing operations and the maintenance activity is a software patch, the software patch can be posted to a web site and made available to others who may deploy the development result.

Managing and Representing Tasks

Cookbooks can also be used by a developer to manage and represent activities that constitute one or more tasks in a development process. A first implementation was discussed above in regard to development request evaluation task 1050 where cookbook 300 could be used to manage and represent activities performed in development request evaluation task 1050.

Figure 11:
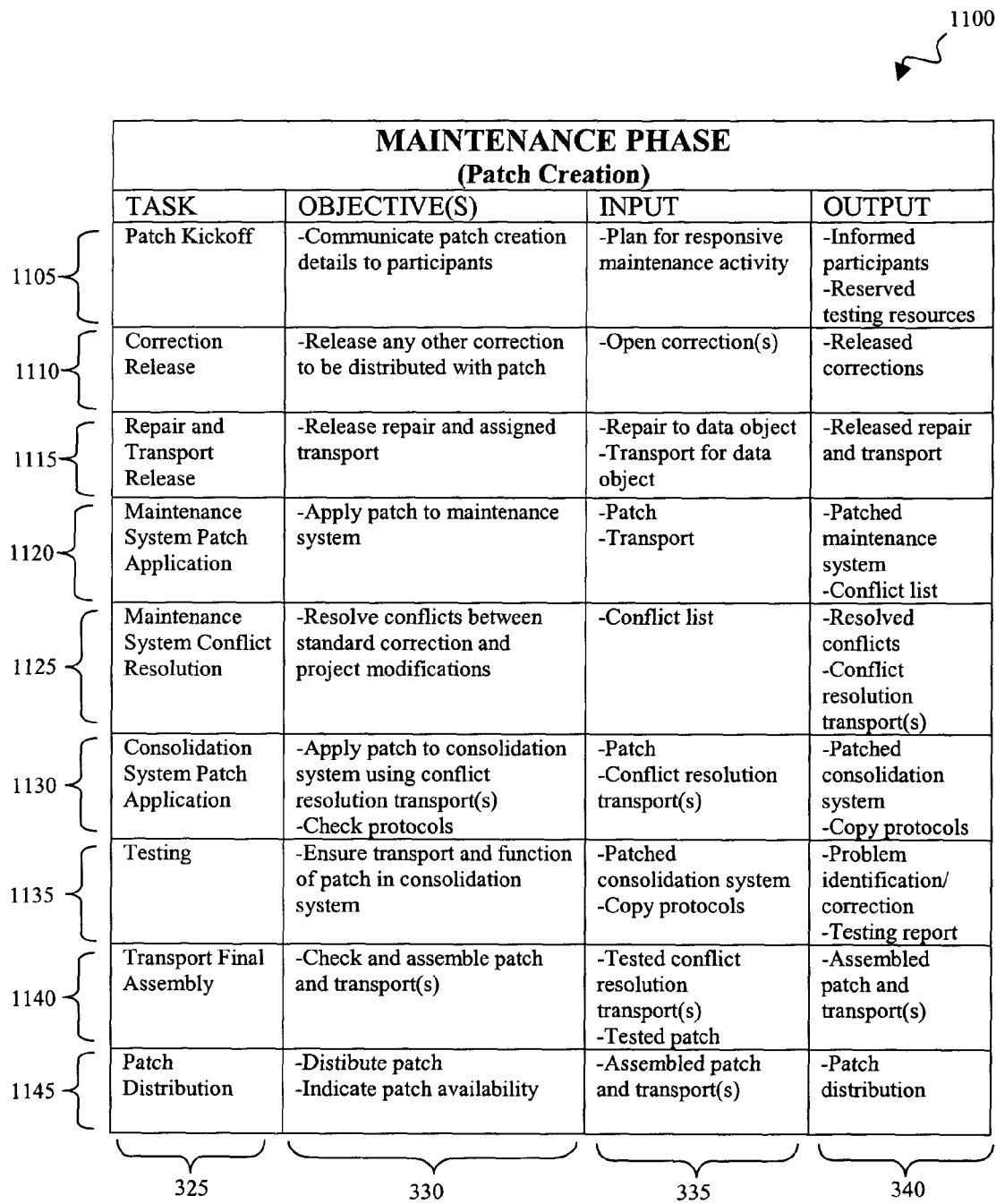
FIG. 11 shows a cookbook for managing and representing patch creation in a maintenance phase of a development process.

Another implementation of the use of cookbooks to manage and represent activities that form one or more tasks involves the use of situational cookbooks that are invoked only when the managed and represented process meets certain criteria or has certain characteristics. For example, maintenance activity performance task 1020 can involve the performance of a number of different types of responsive maintenance activities. When these maintenance activities meet certain criteria or have certain characteristics, then a situational cookbook may be used to manage and represent the maintenance activities. FIG. 11 shows an implementation of such a situational cookbook for managing and representing a specific maintenance activity, namely a situational cookbook 1100 for managing and representing patch creation during the maintenance phase of a development process, when the development result is machine-readable instructions for performing operations.

A patch is a permanent change to source code that is converted to machine-readable instructions to correct a flaw in the original instructions. The flaws corrected by a patch can include defects or omissions so that the patch provides functionality or features that were defined as part of the original design of the program. A patch can be a piece of source code that is inserted into a program that is translated into an executable program.

Cookbook 1100 includes descriptions of a patch kickoff task 1105, a correction release task 1110, a repair and transport release task 1115, a maintenance system patch application task 1120, a maintenance system conflict resolution task 1125, a consolidation system patch application task 1130, a testing task 1135, a transport final assembly task 1140, and a patch distribution task 1145.

Task descriptions 1105, 1110, 1115, 1120, 1125, 1130, 1135. 1140, 1145 include identifier 325, one or more objectives 330, one or more inputs 335, and one or more outputs 340. Descriptions 1105, 1110, 1115, 1120, 1125, 1130, 1135. 1140, 1145 can also include identifications of an entity responsible for performing the task, an entity accountable for performance of the task, and instructions, standards, documentation guidelines, and other resources for performing the task (not shown).

Patch kickoff task 1105 is directed to communicating details regarding the patch creation to participants in the process. The communicated details can include a schedule for patch creation, a plan for creating the patch, and a description of the roles of participants in the patch creation process. The schedule can highlight timeframes for certain steps. The communicated details can also include a reservation of test resources for testing the assembled patch and instructions.

Correction release task 1110 is directed to releasing any other corrections that are to be distributed with the patch. A correction is any alternation to code that changes the behavior of the developed system. A correction is released when it has been approved for general distribution. The release of a correction can prevent further modification of the correction or deletion of the correction. Corrections can be stored in a collection of corrections at a maintenance system used by participants in the maintenance phase of a development process. Undistributed, unreleased corrections can be referred to as open corrections.

Repair and transport release task 1115 is directed to releasing one or more repairs and associated transports. A repair is a change to a data object that corrects a deficiency in the data object. For example, a repair can add new fields to a data object or modify user authorizations to work with existing fields in the data object. The repair can be a changed version of the data object. Together, corrections and repairs can form a patch. A transport is a set of machine-readable instructions for propagating a repair to another data processing system. For example, when the repair is a changed version of the data object, a transport can copy the changed version of the data object into a target system. Ownership of the copied data object can be assigned to the target system or retained at the source system. The copied data object can pass through a transport directory common to both the target system and source system.

A set of transport instructions can also include instructions directed to resolving conflicts between the copied object and one or more objects in the target system. A conflict arises when a prior change to the deficient data object in the target system is not reflected in the object copied from the source system or when a prior change renders the repair unnecessary. For example, a target system may include one or more add-ons or user modifications. Add-ons are additional instructions added to a standard set of machine-readable instructions. The additional instructions can describe the performance of non-standard operations. The non-standard operations can be tailored to the needs of a particular enterprise but otherwise compatible with the standard instructions.

Add-ons can include changes to standard data objects. For example, an add-on can add an additional field to a standard data object. When a repair changes a standard data object at the source system and the target system includes an add-on that has already changed the same standard data object, transport of the repaired data object directly into the target system could deprive the target system of the benefits of the add-on. In particular, transport of the repaired data object could deprive the target system of the changes to the standard data object by the add-on. Such conflicts can be resolved using conflict resolution transport (CRT) and collective conflict resolution transport (CCRT) techniques included in the SAP PATCH ASSEMBLY/DISTRIBUTION ENGINE (SPADE).

Maintenance system patch application task 1120 is directed to applying the patch to the maintenance system. The maintenance system can thus serve as a model target system to test patch application and support packages for patch application. The patch can be applied using one or more transports assigned to repairs included in the patch. The application of the patch to the maintenance system can yield a conflict list. A conflict list is a collection of objects in the target system that have conflicts with the patch. A conflict list can be generated by comparing the objects changed by the patch with objects in the target system that have been previously changed, e.g., by an add-on or user modification.

Maintenance system conflict resolution task 1125 is directed to resolving conflicts between the applied patch and the maintenance system. The conflicts between existing objects and objects copied by applying a patch can be identified in a conflict list formed during maintenance system patch application task 1120. The conflicts can be resolved in a number of different ways. For example, if a prior change to an existing object does not overlap with the changes in the copied object, then the prior change can be accepted into the copied object. This acceptance can occur automatically, i.e., without user input directing the acceptance. If conflicts are more serious, such as when a naming conflict exists or a previously changed object is deleted by the patch, then the acceptance of the prior change may require additional user input to insure resolution of the conflict. Conflict resolution can be supported by the patch or by a separate set of machine-readable instructions for performing operations. For example, the SAP transaction SPAU supports automatic conflict resolution and user input to resolve conflicts. Conflict resolution can yield a collection of approaches to resolving conflicts. The approaches to resolving the conflicts can be used to impart conflict resolution functionality to transports.

Consolidation system patch application task 1130 is directed to applying the patch to a consolidation system. A consolidation system is one or more data processing devices that provide a quality assurance platform for testing a patch and its associated transports. The testing at a consolidated platform is typically the final testing before release of the patch. The consolidation system can be a quality assurance system or a production system. The transports tested at a consolidation system can include conflict resolution functionality. Applying the patch to the consolidation system can also include checking protocols for copying data objects into the target system.

Testing task 1135 is directed to ensuring the correct transport of the patch into the consolidation system, as well as the correct function of the patch in the consolidation system. Testing task 1135 can include regression testing of the patch in the consolidation system. Individual corrections in the patch can be tested before testing task 1135 or during testing task 1135. Problems identified during testing task 1135 can be corrected immediately or resolved during a transport final assembly task 1140.

Transport final assembly task 1140 is directed to checking and assembling the tested patch and any associated transports. Checking and assembling can include the resolution of any remaining problems identified in testing task 1135.

Patch distribution task 1145 is directed to distributing the patch, and associated transports, to one or more target systems. The patch and associated transports can be tangibly embodied in machine-readable media and distributed physically, or the patch and associated transport can be distributed electronically. The patch and transports can also be distributed by informing users of target systems about the availability of the patch and allowing them to participate in the distribution of the patch. For example, an email describing the patch can be sent to all users of potential target systems who can then download the patch from a website as needed.

Managing and Representing Cookbooks

Cookbooks can also be used by a developer to manage and represent a cookbook used to manage and represent a process that forms one or more tasks in a development process. In other words, a high level, less detailed cookbook can be used to manage and represent every task in a lower level, more detailed cookbook. By using a higher level cookbook to manage and represent a lower level cookbook, a framework with different perspectives on a development process can be presented. For example, a less detailed representation of a development process can be presented to a manager who is solely concerned with the overall progress of the development process, whereas a more detailed representation of a development process can be presented to an active participant in the development process who is concerned with performing the daily development activities.

FIGS. 12A, 12B, 12C show an implementation of such a more detailed, lower level cookbook 1200 for managing and representing the evaluation phase of a development process when the development result is machine-readable instructions for performing operations and the party requesting development is an external customer. Such a development result can be referred to as a solution. The detailed activities described in cookbook 1200 can be managed and represented in less detail using cookbook 300 of FIG. 3 above.

Cookbook 1200 includes descriptions of a lead targeting and gathering task 1203, a lead qualification task 1206, a project/service request task 1209, a project/service request approval task 1212, an information gathering task 1215, an opportunity development task 1218, an opportunity assessment task 1221, a staffing/project prioritization preclarification task 1224, a project/service request approval task 1227, an evaluation offer presentation task 1230, an evaluation offer negotiation task 1233, a project charter and business case project team establishment task 1236, a customer business model and business process analysis task 1239, a product strategy definition task 1242, a solution proposal creation task 1245, an ARC sheet creation task 1248, a solution proposal review task 1251, a business case creation task 1254, a risk analysis task 1257, a business case review task 1260, a business case approval and sign-off task 1263, a service/project proposal creation task 1266, a service/project proposal negotiation task 1269, a handover to development task 1272, a license and service agreement check task 1275, a framework agreement negotiation task 1278, a statement of work negotiation task 1281, and a contract execution and filing task 1284.

Tasks 1203, 1206, 1209, 1212 are together represented in lead generation task 305 in cookbook 300, tasks 1215, 1218, 1221, 1224, 1227, 1230, 1233 are together represented in lead qualification task 310 in cookbook 300, tasks 1236, 1239, 1242, 1245, 1248, 1251, 1254, 1257, 1260, 1263, 1266, 1269, 1272 are together represented in evaluation task 315 in cookbook 300, and tasks 1275, 1278, 1281, 1284 are together represented in negotiation task 320 in cookbook 300.

Task descriptions 1203, 1206, 1209, 1212, 1215, 1218, 1221, 1224, 1227, 1230, 1233, 1236, 1239, 1242, 1245, 1248, 1251, 1254, 1257, 1260, 1263, 1266, 1269, 1272, 1275, 1278, 1281, 1284 include an identifier 325, one or more objectives 330, one or more inputs 335, and one or more outputs 340. Descriptions 1203, 1206, 1209, 1212, 1215, 1218, 1221, 1224, 1227, 1230, 1233, 1236, 1239, 1242, 1245, 1248, 1251, 1254, 1257, 1260, 1263, 1266, 1269, 1272, 1275, 1278, 1281, 1284 can also include identifications of an entity responsible for performing the task, an entity accountable for performance of the task, and instructions, standards, documentation guidelines, and other resources for performing the task (not shown).

Lead targeting and gathering task 1203 is directed to identifying and targeting existing customers and potential new customers who may be interested in the development of a new set of machine-readable instructions for performing operations. The instructions can be custom developed for the customers. The customers can be interested in working with the participants in the development process to develop the instructions, or the customers can simply be interested in purchasing a finished product after development is complete. The customers can be targeted using different interaction channels. An interaction channel is a conduit for communicating with the customer. Example interaction channels include the telephone, email, meetings at trade shows, advertising brochures, and Web pages. The targeted customers who respond with interest are leads.

Lead qualification task 1206 is directed to ranking the leads generated in lead targeting and gathering task 1203. Leads can be ranked according to level of promise (e.g., hot, warm, or cold) or in order of promise (most promising, $2^{nd}$ most promising, $3^{rd}$ most promising, . . . ). Leads can be qualified by a group of individuals with expertise in ranking leads. For example, a custom development services team can qualify the generated leads.

Project/service request task 1209 is directed to preparing and presenting information regarding qualified leads to a group of participants who are responsible for approving or rejecting further consideration of the proposed development. This group can be termed a "roll-in team" and can possess expertise in assessing the costs and benefits of developing machine-readable instructions. The information that is prepared and presented can be referred to as a "project/service request." At this point, the project service request need only include a skeleton outline of the proposed development.

Project/service request approval task 1212 is directed to an initial consideration of the project/service request and approval of the project/service request for further consideration by the roll-in team. The initial consideration can prevent further allocation of resources to leads that, for one reason or another, will not be acceptable for development. The initial consideration can be performed by the roll-in team itself.

Information gathering task 1215 is directed to collecting more detailed information regarding a project/service request that was approved in project/service request approval task 1212. The more detailed information can be suitable for making more discriminating decisions regarding performance of the development identified in the project/service request. The more detailed information can be gathered by sending a questionnaire or survey to the customer who proposed the development.

Opportunity development task 1218 is directed to increasing contact with the customer responsible for the approved project/service request. The increased contact typically enhances the business relationship with the customer and provides a better understanding of the customer's position regarding the proposed development. The increased contact can also lead to the gathering of additional information regarding the proposed development. The increased contact can be spurred by the return of a questionnaire or survey regarding the proposed development by the customer.

Opportunity assessment task 1221 is directed to assessing the worthiness of the opportunity presented by the proposed development described in the project/service request for further evaluation. The assessment can be performed in light of the additional information gathered in information gathering task 1215 and opportunity development task 1218. This assessment can use somewhat more stringent criteria than those used in project/service request approval task 1212 since additional information regarding the proposed development and the customer is available.

Staffing/project prioritization preclarification task 1224 is directed to investigating the availability of resources for performance of the proposed development and prioritization of the project/service request with the managers of the development resources. The investigated resources can include both personnel and physical resources. The prioritization of the project/service request can include a rating proposing how the resources can be allocated to competing project/service requests. The managers of the development resources can be the management of a custom development services department.

Project/service request approval task 1227 is directed to approving the project/service request for a more detailed investigation of the proposed development in the project evaluation segment of the evaluation phase of a development process. The project evaluation segment includes subsequent tasks in the evaluation phase that are directed to obtaining additional information regarding the characteristics of the proposed development, as well as tasks directed to analyzing the new and previously obtained information. The approved project/service request can be described as a "qualified project/service request" once it is qualified for further investigation in the project evaluation segment.

Evaluation offer presentation task 1230 is directed to creating an evaluation offer for the customer who proposed the development. An evaluation offer is a formal proposal by the participants in the development process to conduct a detailed evaluation of the proposed development in return for a formal commitment by the customer to consider any proposed development arising out of the evaluation in good faith. Since such a detailed evaluation requires the commitment of resources, an evaluation offer is often a basis for a contractual relationship with the customer. The evaluation offer can be relayed to the customer by a salesperson or the manager of the customer's account.

Evaluation offer negotiation task 1233 is directed to obtaining the customer's acceptance of the evaluation offer. The customer's acceptance can be obtained through a negotiation regarding the terms of each party's commitment to the offer. The acceptance can establish a contractual relationship between the parties.

Project charter and business case project team establishment task 1236 is directed to assembling the resources for the business case creation and evaluation segment of the evaluation phase of a development process. The business case creation and evaluation segment includes the tasks in the evaluation phase that fashion and apply a business case. A business case is an outline of the business benefits and costs of a development. A business case can be used to determine if the business benefits outweigh the initial and on-going investment in time, resources, and funding for the development. The business benefits can include financial benefits such as money earned from the development, strategic benefits that improve the competitive position of the developer, technical benefits that improve the technology infrastructure of the developer, and operational benefits that tangibly or intangibly improve the functioning of one or more products or services offered by the developer. The resources assembled for the business case creation and evaluation segment can include personnel, equipment, and funding. The assembled resources can be described in a project charter. The project charter can include authorizations for deployment of the resources.

Customer business model and business process analysis task 1239 is directed to identifying ongoing and/or planned business initiatives and business events in areas related to the scope of the proposed development. The identified business initiatives and events can be those of the customer or of competitors in the customer's industry. The identified business initiatives and events can yield a better understanding of the customer's industry, including the approaches that competitors are taking to compete with the customer. The identified business initiatives and events can also provide insight into the future needs of the customer and others within the industry. The identified business initiative and development processes can be used to establish a draft solution proposal. A solution proposal is a formal description of the proposed development result. A solution proposal can serve as the basis for the development of the result.

Product strategy definition task 1242 is directed to delineating a business strategy for the developer in the areas related to the scope of the proposed development. The business strategy can be delineated in light of the benefits and costs of the proposed development, as well as the strategic landscape of in the areas related to the scope of the proposed development. The business strategy can be a product strategy that identifies products to be developed in those areas. The business strategy can define a product timeline for the products. The product timeline can include a proposed schedule for developing the products and introducing the products to market. If the proposed development result is a product identified in the business strategy, a development timeline for the proposed development can be a product timeline.

Solution proposal creation task 1245 is directed to proposing a development result through the creation of a solution proposal from a draft solution proposal. Compared to the draft, a solution proposal contains additional detail regarding the proposed solution. For example, the solution proposal can identify specific components that are to be used to develop the development result. The absence of a development can also be proposed in a solution proposal. For example, alternatives to development can be proposed to a customer.

ARC sheet creation task 1248 is directed to creating an ARC sheet. An ARC sheet is a tool that can help clarify the business scenario of the proposed development to the participants in a development process. A business scenario can include the relevant market requirements for developments in the area of the scope of the development. Creating an ARC sheet can include identifying and classifying relevant market requirements, including the market requirements of the customer who requested the development. An ARC sheet can also define details regarding the development process and development result, as well as the participants who are to participant in the development process. For example, an ARC sheet can define the participation of departments or business units of a developer organization in the development process. An ARC sheet can be updated throughout the evaluation phase of a development process.

Solution proposal review task 1251 is directed to reviewing the solution proposal both internally within a developer enterprise and jointly in conjunction with the customer who requested development. The review can lead to an internal and external acceptance of the solution proposal and can serve as the basis for a further commitment to the development embodied in the solution proposal.

Business case creation task 1254 is directed to summarizing and documenting the predicted viability of the proposed development. The viability of the proposed development can be determined using information in the solution proposal, and the solution proposal can be appended to a business case. A business case is a formal documentation of the predicted viability of the proposed development. A business case can include an analysis of the customer and market, an overview of the proposed solution, an analysis of the process needed to develop the proposed solution (including effort and time estimates), a proposed organizational scheme for the development participants, project milestones for the proposed development process, predictions regarding the production of the development result, a financial, cash flow, and profitability analysis of the proposed development, the funding requirements of the proposed development, a budget for the proposed development, and predictions regarding the revenue expected to be recognized by the proposed development. The level of detail of a business case can depend on the expected size of the development process.

Risk analysis task 1257 is directed to assessing the uncertainty, the possibility of loss, and the possibility of other undesirable events associated with the proposed development. Risk analysis can include identifying potential losses and the likelihood of those losses, as well as the consequences if those losses are realized. Losses can be tangible (such as money, time, customer) and intangible (such as reputation and goodwill). The analysis of risk can be documented in risk analysis documentation.

Business case review task 1260 is directed to an internal review of the predicted viability of the proposed solution. The review can include a review of the business case and risk analysis of the proposed development result. The review can try to ensure that the proposed solution is the best approach to achieving the desired functionality of the development result. The review can be conducted by a manager of the evaluation phase participants or by the evaluation phase participants themselves.

Business case approval and sign-off task 1263 is directed to receiving approval for the proposed solution from a party responsible for the proposed solution. Receiving approval for the proposed solution can include presenting the reviewed business case to the responsible party. The responsible party can be a group of evaluation phase participants (such as a decision/evaluation board) with expertise in the evaluation of solutions. The responsible party can also withhold approval for the proposed solution, for example, by recommending alternative solutions.

Service/project proposal creation task 1266 is directed to establishing a description of the proposed solution for the customer. The description of the proposed solution can be based on information included in the business case. The description can be a service/project proposal which identifies how the proposed solution is responsive to a corresponding project/service request. The description of the proposed solution can include a formal offer for development of the proposed solution. The description can also include recommendations for alternative approaches that are responsive to the project/service request but do not involve development of a solution by the developer.

Service/project proposal negotiation task 1269 is directed to reaching an agreement with the customer regarding the proposed solution. The agreement can include contract negotiations in which recommendations are made to the customer and the customer's acquiescence to those recommendations is either received or denied.

Handover to development task 1272 is directed to planning the development stage of the development process. The planning can include a definition of the developmental approach, detailing the proposed solution, establishing a working environment for the proposed solution, and staffing the development stage with participants.

License and service agreement check task 1275 is directed to confirming the scope and propriety of any existing license and service agreements with the customer and to supplementing the existing agreements as necessary. A confirmation of existing license and service agreements can include a confirmation that the customer has licensed the components that are included in the proposed solution and a confirmation that a service agreement exists covering implementation of the proposed solution for the customer. License and service agreement check task 1275 can also include clarifying and/or renegotiating appropriate license and/or service agreements with the customer as needed.

Framework agreement negotiation task 1278 is directed to reaching a framework agreement with the customer regarding the proposed solution. A framework agreement is the first stage in the negotiation of a contract for the development of the proposed solution. A framework agreement can establish the process, items, and timetable for the development of the proposed solution. The framework agreement can be negotiated by the participants in an enterprise responsible for the customer's account and/or by the proposed manager of the development process.

Statement of work negotiation task 1281 is directed to reaching an agreement with the customer regarding a statement of work for the proposed development process. A statement of work is a definition of the proposed development. A statement of work can specify the development activities to be completed and the goods and/or services to be delivered. For example, a statement of work can specify one or more expected development results (including development objectives, products, and deliverables), the quality of the development results (including standards, limitations, constraints, terms, and any required procedures or approaches), a development schedule (including deadlines and target dates), a development budget (including time, expenses, cost limits, and resource budgets), and the development participants (including a development manager and coordination with other tasks or groups). Two or more statements of works can be used to define different aspects of the proposed development. A statement of work can be established based on a framework agreement, a business case, a solution proposal, and/or a service/project proposal for the development.

Contract execution and filing task 1284 is directed to obtaining and storing a joint manifestation of acceptance of the proposed development by the customer and the developer. The proposed development can be defined in a statement of work. The manifestation of acceptance can be the signature of both parties on a contract. The contract can be stored for reference.

Figure 13:
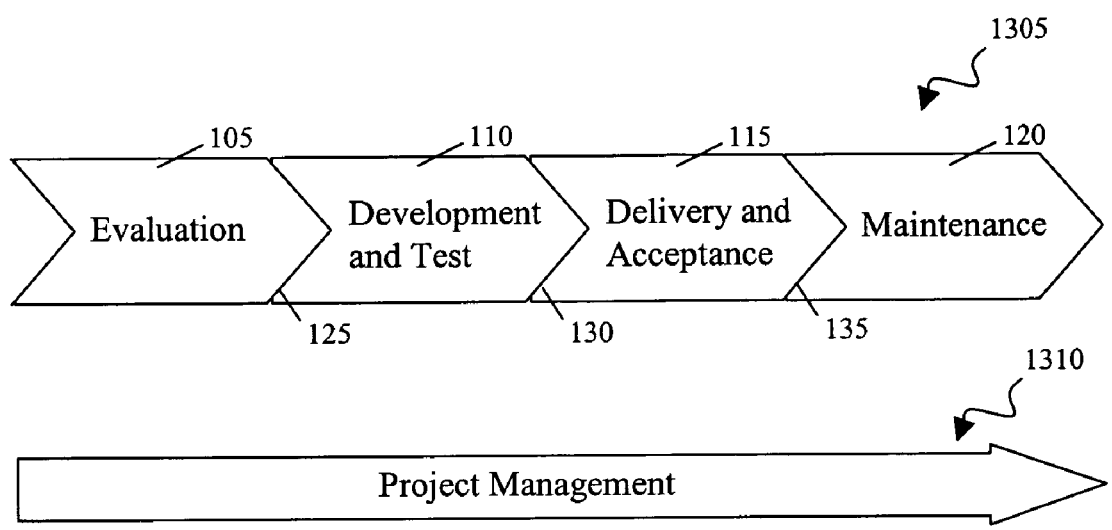
FIG. 13 shows a another framework of a development process.

FIG. 13 shows a schematic representation of another implementation of a development process 1300. Development process 1300 includes a development track 1305 and a project management track 1310. Development track 1305 includes evaluation phase 105, development and test phase 110, delivery and acceptance phase 115, and maintenance phase 120 as discussed above with regard to development process 100 of FIG. 1.

Project management track 1310 can include systems and techniques to manage and represent project management activities that are concurrent with evaluation phase 105, development and test phase 110, delivery and acceptance phase 115, and maintenance phase 120 of development track 1305. Project management activities are acts performed to plan, schedule, and control a temporary endeavor undertaken to create a product or service. Project management activities can include the achievement of performance, cost, and time objectives. For example, project management activities can include ensuring that project elements (including personnel) are properly coordinated to perform all required tasks in a timely manner, within an approved budget, to achieve a certain quality with an identified and acceptable project risk.

Project management track 1310 can be performed by a developed using one or more cookbooks to manage and represent the activities in project management track 1310. The tasks in a project management cookbook can be arranged to correspond to a sequence of tasks in a cookbook used to manage and represent phases in a development track. The correspondence can be a one-to-one correspondence or the correspondence can be a loose tracking of the sequence of phases in a development track.

Information can be exchanged between a project management cookbook and a development cookbook. The exchanged information can be used to perform tasks in either cookbook and to record the results of project management or development activities.

Within a project management cookbook, the output from a task can be the input to a subsequent task. The tasks can be optional or particular to certain project management approaches. The tasks can be deleted or modified, and the deletion or modification can be accommodated by the cookbook. The description of a task can be customized to a specific corresponding development process to yield a durable, accessible, and structured record of the corresponding development process. Cookbooks, and the customization of task descriptions, can be stored in machine-readable format to facilitate information exchange within an enterprise and quantitative analysis of development processes.

FIGS. 14A, 14B, 14C, 14D, 14E show a cookbook 1400 for managing and representing project management of the development and test, delivery and acceptance, and maintenance phases of a development process directed to development of a set of machine-readable instructions for an external customer. Cookbook 1400 includes descriptions of a development and test phase initiation task 1402, a project steering committee establishment task 1404, a handover evaluation and engagement task 1406, a deliverables sign-off task 1408, a specification stage initiation task 1410, a project lifecycle repository initiation task 1412, a project lifecycle repository check-in task 1414, a project structure creation task 1416, a product and production management system update task 1418, a legal agreement completion task 1420, a system landscape planning and procurement task 1422, an ARC sheet update task 1424, a shared services engagement planning task 1426, a project plan detailing task 1428, a project organization and team member identification task 1430, a customer involvement planning and approval task 1432, a participant commitment confirmation task 1434, a preliminary test phase planning task 1436, a project charter management task 1438, a communication management development task 1440, a risk management task 1442, a development issues tracking task 1444, a change management task 1446, a lessons learned tracking task 1448, a project monitoring plan development and implementation task 1450, a documentation recording and release task 1452, a project structure update task 1454, a project kickoff task 1456, a quality characteristics planning task 1458, a retrofit planning task 1460, a maintenance planning task 1462, a production validation planning task 1464, a specification stage sign-off task 1466, a specification documentation check-in task 1468, an execution monitoring task 1470, a design stage sign-off task 1472, a design documentation check-in task 1474, an execution monitoring task 1476, an implementation stage sign-off task 1478, an implementation documentation check-in task 1480, an execution monitoring task 1482, a handover task 1484, a maintenance handover task 1486, a test stage sign-off task 1488, a test documentation check-in task 1490, an execution monitoring task 1492, and a delivery and acceptance phase initiation task 1494.

Descriptions 1402, 1404, 1406, 1408, 1410, 1412, 1414, 1416, 1418, 1420, 1422, 1424, 1426, 1428, 1430, 1432, 1434, 1436, 1438, 1440, 1442, 1444, 1446, 1448, 1450, 1452, 1454, 1456, 1458, 1460, 1462, 1464, 1466, 1468, 1470, 1472, 1474, 1476, 1478, 1480, 1482, 1484, 1486, 1488, 1490, 1492, 1494 include an identifier 325, one or more objectives 330, one or more inputs 335, and one or more outputs 340. Descriptions 1402, 1404, 1406, 1408, 1410, 1412, 1414, 1416, 1418, 1420, 1422, 1424, 1426, 1428, 1430, 1432, 1434, 1436, 1438, 1440, 1442, 1444, 1446, 1448, 1450, 1452, 1454, 1456, 1458, 1460, 1462, 1464, 1466, 1468, 1470, 1472, 1474, 1476, 1478, 1480, 1482, 1484, 1486, 1488, 1490, 1492, 1494 can also include identifications of an entity responsible for performing the task, an entity accountable for performance of the task, and instructions, standards, documentation guidelines, and other resources for performing the task (not shown).

Development and test phase initiation task 1402 is directed to project management of the transition from an evaluation phase to a development and test phase of a development project. Project management of the transition can include establishing a core project team. A core project team is a group of participants in the development who are responsible for the development and test phase of a development project. A core project team can be involved in every task of the development and test phase even when members of the team are not responsible for performing certain tasks. For example, core project team members can have oversight or advisory roles in tasks.

The characteristics and number of members of a core project team can be determined by the size, complexity, requirements, and available customer finding for the development. A core project team can include a project manager and a solution designer. A project manager is a participant in the development process who is responsible for oversight and decision making regarding the development process. A solution designer is the primary technical designer of the solution resulting from the development process. A core project team can also include a product management representative, a quality management representative, a knowledge management specialist/technical editor, a subject matter expert, and an industry expert. A product management representative is a development participant who is primarily responsible for communicating and reconciling the perspectives of participants who are to market the product, participants who are to produce the product, and participants who are to develop the product. A quality management representative is a development participant who is primarily responsible for ensuring that the developed product has the qualities or features needed to meet development requirements and/or standards. A knowledge management specialist/technical editor is a development participant who is primarily responsible for ensuring that technical information and know-how gained and applied during the development process is recorded and made available to those who review the development process. A subject matter expert is a development participant who is primarily responsible for providing expertise regarding a specialized field related to the development. An industry expert is a development participant who is primarily responsible for providing expertise regarding the industry in which the product is to be applied.

Project steering committee establishment task 1404 is directed to recruiting a steering committee to monitor the progress of development and to contribute to selected project events. The steering committee can act as a review board and confirm the overall direction of the development and resolve conflicts between members of the core team. The steering committee can also contribute by assisting in decision making regarding significant issues such as whether to proceed with development, changes in the scope of the development, and quantification of the status and risks of the development. The steering committee can include a project sponsor and a program operations liaison. A project sponsor is generally a participant with business expertise who can champion the development. In general, a project sponsor is a relatively senior executive who can set development objectives and legitimize the development within the developing organization. A project operations liaison is a participant who can interface with the daily development effort for the steering committee.

Handover evaluation and engagement task 1406 is directed to managing the review and evaluation of the deliverables from the evaluation phase for completeness and accuracy. After the review and evaluation, the deliverables can be delivered to the participants in the development process who will be responsible for the development and test phase of the development process.

Deliverables sign-off task 1408 is directed to managing a confirmation of the acceptability of the deliverables handed over from the evaluation phase. For example, the completeness and accuracy of the deliverables can be confirmed in light of current information regarding the development. The acceptability of the deliverables can be confirmed by the participants in the development and test phase of the development process. The confirmation of the acceptability of the deliverables can be used as an indication of the formal commencement of the development and test phase of a development process. The accepted deliverables can include one or more of a business case, a solution proposal, a statement of work, an ARC sheet, an executed contract, a service/project proposal, and project management tools such as a project milestone plan. The approved deliverables can be stowed in a central repository for reference.

Specification stage initiation task 1410 is directed to managing the beginning of the specification stage of the development and test phase of a development process. A specification stage is the portion of the development and test phase directed to delineating the requirements for the development result. The specification stage can include tasks directed to such a delineation. For example, the specification stage can include every task in the specification stage of a development process (as shown in cookbook 400 of FIGS. 4A and 4B), or the specification stage can include a subset of the tasks in a specification stage (such as tasks 405, 410, 415 of FIG. 4A). The specification stage can proceed in parallel with other development planning and preparation tasks.

Project lifecycle repository initiation task 1412 is directed to managing the preparation of the project lifecycle repository to receive information. A project lifecycle repository is a centralized information store for information related to the development. A project lifecycle repository can be document-based. Documents stored at a project lifecycle repository can be classified, e.g., according to the function or version of the document. A project lifecycle repository can include management and intellectual property documents relating to the development process. Access to such documents can be restricted to selected participants in the development process. Initiating a project lifecycle repository can include identifying the classes of documents to be stored in the repository and/or identifying the authorizations of users allowed to access documents in the repository or check documents into the repository.

Project lifecycle repository check-in task 1414 is directed to transferring acceptable documents from the evaluation phase into the project repository. Among the documents that can be transferred are a business case, a solution proposal, a statement of work, an ARC sheet, an executed contract, a service/project proposal, and project management tools such as a project milestone plan. The transferred documents can establish the basis for intellectual property claims based on the development.

Project structure creation task 1416 is directed to managing the establishment of a project structure for the development process. A project structure is an assembly of resources, including personnel and equipment, for performing and managing the development process. Establishing the project structure can include reassessing preliminary estimates performed during the evaluation phase, documenting the project budget (including revenue/cost and plan/actual), and establishing a time/cost tracking system. The established project structure can be entered into an information strategy planning tool (ISP) to establish a baseline for on-going project cost monitoring and control. An information strategy planning tool can also bill the customer for the development as appropriate.

Product and production management system update task 1418 is directed to entering, reviewing, and updating entries in a product and production management system (PPMS). The entries can include the names and descriptions of components, component versions, products, and product versions. The entries can be received from the evaluation phase of a development process.

Legal agreement completion task 1420 is directed to ensuring that all necessary legal agreements with the customer have been reached. Ensuring that agreements have been reached can include checking existing agreements as well as the preparation and negotiation of any omitted agreements. The agreements can include a statement of work and a non-disclosure agreement. The agreements can cover the entire development process or the agreements can apply to a defined portion of the development process. The relevant portion of the development process can be identified using checkpoints, milestones, or other delineation of position within the development process. The agreements can be stowed in a central repository for reference.

System landscape planning and procurement task 1422 is directed to identifying, documenting, and procuring the technical infrastructure needed to produce a system environment for the function of the development result. The technical infrastructure can include both hardware and software. The technical infrastructure can be the system environment specified by the customer during negotiations. The technical infrastructure can be procured some time (e.g., four weeks) before implementation of the development result begins. The technical infrastructure can be procured by receiving access to the customer's system environment, or the technical infrastructure can be procured at the developer's site for development and testing of the development result before the result is delivered to the customer.

ARC sheet update task 1424 is directed to updating an ARC sheet to reflect the current state of the development and the development process. An ARC sheet can be updated to reflect new and revised detail that impacts upon the business scenario of the proposed development. The detail can regard the development components, the development deliverables, the architecture of the proposed result and operating environment of the result, the resource requirements for the development and the result, and resource commitments to the development. The updating of the ARC sheet can be continuous throughout the development process. The ARC sheet updates can reflect the state of the development using various status indicators, such as a green indicator, a yellow indicator, or a red indicator. The ARC sheet updates can reflect the state of the development when the development depends in part upon contributions made by external individuals. External individuals are individuals who are not participants in the development process. Examples of external individuals include $3^{rd}$ parties who are members of neither the developer enterprise nor the customer enterprise, or members of the developer enterprise who are providing components of the development result that were developed for purposes other than achievement of the development result. For example, a group in the developer enterprise can provide a core component of a system landscape that is used by the development result but the core component was not developed with the development result in mind.

Shared services engagement planning task 1426 is directed to identifying and arranging development activities performed by individuals in the developer enterprise who have specialized skills and contribute to a number of different development processes in rolls defined by those skills. Examples of such specialized skills include quality management of developments, knowledge management of developments, and production management of developments. The individuals with specialized skills can be organized into departments or services defined by the specialized skills. The arranged development activities can be identified in a project plan, a milestone plan, or other development schedule.

Project plan detailing task 1428 is directed to refining and updating a project plan. A project plan can be comprehensive in that it addresses every phase of the development process, or a project plan can address only selected activities, such as development activities, in the development process. The project plan can be preliminary in that it only reflects current understanding of the development and development process. Refinement and updating of the project plan can include internal reviews with team members and at various points during the project to refine the plan as needed. The project plan can delineate implementation work into discrete work packages. The work packages can have a limited duration (for example, less than 50 days). These work packages can be entered as individual activities in an information strategy planning system (ISP). The project plan can also include a milestone plan and a shared services engagement plan.

Project organization and team member identification task 1430 is directed to specifying the structure, roles, and responsibilities for the development process. Specifying the structure of the development process can include defining requests for performance of specific development activities by developer departments or other participants in the development process. Internal and external resources can be evaluated, requisitioned, and assigned to aspects of the development process or participants in the development process. The evaluation and requisition of resources can be performed in conjunction with development participants with specialized expertise such as a program operations department. Specifying the structure of the development process can include defining and documenting an approach for internal escalation of important decisions regarding the development result.

Specifying the rolls of the development process can include determining whether or not a roll is necessary and how to staff a necessary roll. For example, whether or not a devoted quality manager is necessary and, if so, whether or not the position should be staffed full-time or part-time can be determined. Example rolls in a development process can include a liaison to another group or department in the developer enterprise (such as a production management liaison or a marketing liaison), a quality manager, a test coordinator, a knowledge manager, a technical editor, a translator, a solution developer, a solution designer, a solution architect, an expert in a specific subject or industry, a project manager, a project lead, and a project director.

The specified structure, roles, and responsibilities for the development process can be described in a resource plan. A resource plan is a statement of the specific fiscal, material, and personnel resources needed to develop the development result. A resource plan can match development resources with development objectives, identify the availability of resources, and provide a framework for monitoring and controlling resource expenditures.

Customer involvement planning and approval task 1432 is directed to defining and receiving customer acceptance of a role in the development process. The customer roll can be proposed to the customer and the subject of negotiations with the customer. The roll can include a schedule for the customer's participation and an identification of specific customer personnel who are to be involved in the development process. The definition of the customer's roll can be preliminary in that it can be reviewed and updated. For example, the definition of the customer's roll can be changed up to a customer kick-off meeting where the customer formally agrees to the defined roll.

Participant commitment confirmation task 1434 is directed to confirming the commitment of participants to the development process. The commitment of participants can be confirmed by the participants or by managers of the participants. The participants can be, e.g., project team members, other departments within the developer enterprise, and $3^{rd}$ parties who are to participate in the development. The commitment of a participant can be full-time or part-time (e.g., as defined by a percent time commitment). The commitment of participants can be confirmed and defined using formal participation requests and/or contracts.

Preliminary test phase planning task 1436 is directed to preliminary planning of one or more testing approaches. The preliminary plans can be based on existing approaches and/or protocols for testing machine-readable instructions. The testing approaches can be implemented in the test stage of a development and test phase of a development process. The preliminary plans can include approaches and/or protocols for internal and external communications of testing requirements and results and the identification of items with long lead times. Items with long lead times can be addressed before other items. The approaches and/or protocols for internal and external communications can be used to establish a test phase communication plan. The scale of the planned testing can be proportionate to the size and complexity of the development. Example testing approaches can include module integration testing, development tests, and acceptance testing.

Project charter management task 1438 is directed to creating, updating, reviewing, and approving the project charter for the development activities in the development process. A project charter can serve as a formal indication of the existence of a development project. A project charter can establish, in broad terms, the scope and condition of the development activities. For example, the project charter can establish the rights and responsibilities of the development participants, the developer organization, and the customer. The project charter can also serve to align customer and development participants expectations and set the initial project scope, organizational direction, and boundaries. The project charter can reflect the size of the project and can link to other documentation to avoid redundancy and/or the possibility of introducing inconsistencies between documents. The project charter can be reviewed by a participant with specialized expertise such as a program operations liaison. The approved project charter can be signed by development participants and stored for reference.

Communication management development task 1440 is directed to defining and documenting processes and plans for the management of communications in the project. Project communications involve making germane project information available in a timely manner to participants in the development process. Project information is germane when it facilitates the participant's participation in the development or when it relates relevant information to the customer. Examples of project communications can include information distribution, performance reporting, and closure. The defined processes and plans for managing communications can be documented in a project charter or documented separately, e.g., in a communications management document.

Risk management task 1442 is directed to establishing and implementing a risk management plan. A risk management plan is a strategy for recognizing and handling risks associated with the development. Recognizing risks can include identifying, categorizing, quantifying, analyzing, controlling, tracking, and communicating risks. A risk management plan can describe the development and implementation of risk mitigation strategies, including mitigation effectiveness tracking. Establishing a risk management plan can include importing identified risks (e.g., risks identified in the evaluation phase) into the risk management plan and updating the plan to include new risks, responsibilities, and actions as they are identified. When a risk management is established, risk monitoring processes, including different approaches and frequencies, can be established. A risk management plan can be established and implemented by one or more participants in the development process with expertise in recognizing and handling risks. For example, a risk management plan can be established and implemented by a program operations department.

Development issues tracking task 1444 is directed to monitoring and reviewing development issues. Development issues are vital or unsettled matters in the development or development process. Issues can be technical or other bottlenecks through which the development must pass to achieve the development goals. Issues can be tracked using issue tracking processes and procedures that establish consistent criteria and methods for tracking and resolving issues. For example, issues can be tracked using a spreadsheet or other approach for documenting the issues, progress made toward resolving the issues, the status of the issues (e.g., open, closed, or on hold, critical, important, or minor), dates, and other issue information. Issues can be reviewed with the participants in the development process, including the customer.

Change management task 1446 is directed to managing the transition from one activity or aspect of the development process to another. Change management task 1446 can include a planned approach to supporting and integrating change that impacts on the development process and the development result. Change that impacts the development process and the development result can include changes to the development components, the development scope, the development budget, the development schedule, and the development resources. Change can be managed using change requests. A change request is a formal appeal for permission to modify an activity or aspect of the development or development process. For example, a change request can be a requirement for a participant in the development process to modify an existing component (such as a document, data file, or code) that has already been developed and undergone review, and hence may be serving as the basis for the development of other components. Managing transition in an activity or aspect can include confirming the acceptability of the transition with the customer. The acceptability can be confirmed by examining existing legal agreements with the customer or by expressly discussing the proposed transition with the customer. Managing transition can also include documenting changes to activities or aspects of the development process. For example, change requests can be stored for reference, e.g., by a program operations department.

Lessons learned tracking task 1448 is directed to reviewing the development process to identify and document teachings learned in the development process that may be applicable to other development efforts. Learned lessons can be documented in a final report presented during development closeout.

Project monitoring plan development and implementation task 1450 is directed to defining and implementing a strategy for monitoring the development process. The developed strategy can define the communication of monitoring information to participants in the development process. For example, the developed procedures can include status reporting and updating. The monitoring can concentrate on select area of the development process, such as risk management, change management, issue tracking, cost controlling and tracking, project scheduling, lessons learned, and individual/team performance reporting. The format, frequency, and recipients of monitoring information can be defined based on a project communication plan and information that may be part of the project charter. The development process can be monitored by a participant with specialized monitoring expertise such as a program operations department.

Documentation recording and release task 1452 is directed to archiving relevant documents for reference. For example, relevant documents can be archived into an information strategy planning system (ISP) to support intellectual property documentation requirements. Documentation recording and release task 1452 can also include the release of a master plan. A released master plan can include a production schedule, a system schedule, and a development plan. The production schedule can include milestones and deadlines for production. The system schedule can include information regarding the system landscape, system availability, and transport landscape. The development plan can describe a series of individual projects for the creation of the development result for that component and release. The description of each individual project can describe the employee days devoted to activities in the project. A master plan can be released in an information strategy planning system.

Project structure update task 1454 is directed to updating the project structure to reflect the current state of the development and the development process. The project structure can be stored in an information strategy planning system (ISP).

Project kickoff task 1456 is directed to reviewing information regarding the development and development process with participants in the development process. Information can be reviewed at internal meetings and meetings that include the customer. The meetings can be held early in the development process to align development participants. The reviewed information can be based on the audience. For example, the reviewed information can include development goals, development deliverables, development scope, development risks, progress to date (current status update), development logistics and organization, logistics for future status updates, a development document repository, development naming conventions, development participant roles and responsibilities, and customer participation. The review of information can include the establishment of a description of the participation of the development participants, including the logistics of the participation of participants in the development. For example, a development team charter can be established.

Quality characteristics planning task 1458 is directed to developing a strategy for ensuring the quality of the development. The quality of the development can be ensured by ensuring that the development has certain characteristics or meets certain standards. Examples of classes of such standards and characteristics include functional correctness characteristics, usability standards, globalization standards, open source standards, $3^{rd}$ party standards, application integration and interfaces standards, technical implementation and change management standards, performance characteristics, security characteristics, accessibility standards, data archiving standards, documentation standards, development environment characteristics, and invention standards. Ensuring that the development has certain characteristics or meets certain standards can include developing plans for confirming the characteristics or standards and documenting the results of the confirmations. Such documentation can be stored at a central location such as a project lifecycle repository for future reference.

Retrofit planning task 1460 is directed to planning the installation of the development result into an existing framework for operation of the result. For example, the machine-readable instructions developed for the customer may be contractually required to function in conjunction with an existing set of machine-readable instructions. Planning the installation of the development result can include establishing timelines, milestones, and commitments for the installation. A retrofit plan can be included in the project charter.

Maintenance planning task 1462 is directed to establishing a maintenance team, maintenance processes, and maintenance infrastructure. For example, resources, landscape(s), timelines, and service levels can be determined and allocated for maintenance of the development result.

Production validation planning task 1464 is directed to developing a production validation plan for testing the development result to ensure that the result meets certain requirements. The scope of the validation can depend upon the nature of the development. The development result can be tested at the component level to ensure that the components meet requirements or the development result can be tested as a whole to ensure that the entire result meets certain requirements. For example, the entire development result can be subject to an installation test or an upgrade test to ensure that it meets installation or upgrade requirements. The production validation plan can be based on a production validation plan template. The template can be prepopulated with standard acceptance criteria that are typically met by products or services of the same type as the development result. The development of a production validation plan can indicate the start of a handover of the development result from participants in the development and test phase to participants in the production stage of a development process.

The production validation plan can also include an estimate of resources required to validate the development result, a validation schedule, a description of a test landscape, an identification of a responsible participant, a description of how a test is to be conducted, an identification of test tools (such as a computer aided test tool (CATT)), an identification of other test inputs (such as an installation guide), quality goals and parameters, and an identification of issues, risks, and mitigation strategies. The validation schedule can be based on overall project plan.

The production validation plan be preliminary in that it is subject to change. For example, production validation plan can be reviewed by development participants and modified as indicated by the reviewing participants. The production validation plan can be reviewed at a kick-off meeting and the modified plan can be distributed later to participants in the kick-off meeting.

The production validation plan can be a validation project charter. A validation project charter can be a formal indication of the existence of a validation project. A validation project charter can establish the scope and condition of the validation activities in the development process. Either a production validation plan or a validation project charter can be a discrete collection of information such as a document or a machine-readable file.

The validation plan can be developed by development process participants (such as the project manager, solution designer, and quality manager) in conjunction with a liaison to a production management team. The participants can work together to develop the validation plan at one or more meetings or through conference calls. For example, the participants can hold a meeting approximately three to five weeks prior to handover of the development result to production. The production validation plan can also be developed in conjunction with a customer, especially when the development is performed at the customer's site.

Specification stage sign-off task 1466 is directed to confirming that a customer accepts a proposed specification. Confirming customer acceptance can include confirming that a customer has read and understood the contents of the specification phase, confirming that the contents of the specification accurately represent the functionality of the machine-readable instructions to be developed, confirming that the customer representative is authorized to accept the contents, confirming that the customer authorizes the beginning of the next phase of the development process, and confirming that the customer has the authority to accept the proposed specification. If customer acceptance is confirmed, then the development process can proceed to the design stage of the development process. If the customer does not accept the specification, then the specification can be renegotiated or the development process can be closed out, as appropriate. The project manager can confirm customer acceptance of the specification alone or in conjunction with a program operations liaison. The customer's acceptance can be manifested by a signature on a specification approval form. The signed specification approval form can be stowed in a central location, along with the corresponding specification, for reference.

Specification documentation check-in task 1468 is directed to archiving documentation generated during the specification stage of the development process. The specification documentation can be archived in a central repository, such as a project lifecycle repository or an information strategy planning system (ISP), for reference. The archive documentation can be used to establish intellectual property rights to the development.

Execution monitoring task 1470 is directed to project management of the design stage of the development and test phase of a development process. Execution monitoring task 1470 differs from execution monitoring task 505 in that execution monitoring task 505 primarily deals with gathering and updating project management information, whereas execution monitoring task 1470 primarily deals with applying the gathered project management information in various project management systems and techniques. For example, project management information can be applied in project cost tracking, a project plan, project scheduling, a change management plan, a risk management plan, issue tracking, status reporting, a communications plan, lessons learned, and individual/team performance reports. Execution monitoring task 1470 can be ongoing throughout the design stage and execution monitoring task 1470 can be performed by a participant with specialized expertise such as a program operations department. Appropriate project management of the design stage can be a requirement for further activities in the development and test phase of the development process.

Design stage sign-off task 1472 is directed to confirming that a customer accepts design stage deliverable(s) such as a proposed design of the development result, a scenario design, and a component design. Confirming customer acceptance can include confirming customer acknowledgement of completion of the design stage, confirming that the customer has read and understood the contents of the design deliverable(s), confirming that the customer is authorized to accept the deliverable(s), confirming that the customer authorizes the beginning of the next stage of the development, and confirming that the customer is authorized to accept to the design stage deliverable(s).

If customer acceptance is confirmed, then the development process can proceed to the implementation stage of the development and test phase of the development process. If the customer does not accept the design stage deliverables, then the deliverables can be adjusted or the development process can be closed out, as appropriate. The project manager can confirm customer acceptance to the design stage deliverables alone or in conjunction with a program operations liaison. The customer's acceptance can be manifested by a signature on a design stage deliverables approval form. The signed design stage deliverables approval form can be archived in a central location, along with the corresponding design stage deliverables, for reference.

Design documentation check-in task 1474 is directed to archiving documentation generated during the design stage of the development and test phase of the development process. The design documentation can be archived in a central repository, such as a project lifecycle repository or an information strategy planning system (ISP), for reference. The archive documentation can be used to establish intellectual property rights to the development.

Execution monitoring task 1476 is directed to project management of the implementation stage of the development and test phase of a development process. Execution monitoring task 1476 differs from execution monitoring task 605 in that execution monitoring task 605 primarily deals with gathering and updating project management information, whereas execution monitoring task 1476 primarily deals with applying the gathered project management information in various project management systems and techniques. For example, project management information can be applied in project cost tracking, a project plan, project scheduling, a change management plan, a risk management plan, issue tracking, status reporting, a communications plan, lessons learned, and individual/team performance reports. Execution monitoring task 1476 can be ongoing throughout the implementation stage and execution monitoring task 1476 can be performed by a participant with specialized expertise such as a program operations department. Appropriate project management of the implementation stage can be a requirement for further activities in the development and test phase of the development process.

Implementation stage sign-off task 1478 is directed to confirming that a customer accepts implementation stage deliverable(s) such as an implementation of the development result, a master guide checklist, a test readiness review, and a maturity report. Confirming customer acceptance can include confirming customer acknowledgement of completion of the implementation stage, confirming that the customer has read and understood the contents of the implementation deliverable(s), confirming that the customer is authorized to accept the deliverable(s), confirming that the customer authorizes the beginning of the next stage of the development, and confirming that the customer is authorized to accept the implementation stage deliverable(s).

If customer acceptance is confirmed, then the development process can proceed to the test stage of the development and test phase of the development process. If the customer does not accept the implementation stage deliverables, then the deliverables can be adjusted or the development process can be closed out, as appropriate. The project manager can confirm customer acceptance of the implementation stage deliverables alone or in conjunction with a program operations liaison. The customer's acceptance can be manifested by a signature on a implementation stage deliverables approval form. The signed implementation stage deliverables approval form can be archived in a central location, along with the corresponding implementation deliverables, for reference.

Implementation documentation check-in task 1480 is directed to archiving documentation generated during the implementation stage of the development process. The implementation documentation can be archived in a central repository, such as a project lifecycle repository or an information strategy planning system (ISP), for reference. The archive documentation can be used to establish intellectual property rights to the development.

Execution monitoring task 1482 is directed to project management of the test stage of the development and test phase of a development process. Execution monitoring task 1482 differs from execution monitoring task 705 in that execution monitoring task 705 primarily deals with gathering and updating project management information, whereas execution monitoring task 1482 primarily deals with applying the gathered project management information in various project management systems and techniques. For example, project management information can be applied in project cost tracking, a project plan, project scheduling, a change management plan, a risk management plan, issue tracking, status reporting, a communications plan, lessons learned, and individual/team performance reports. Execution monitoring task 1482 can be ongoing throughout the test stage. Execution monitoring task 1482 can be performed by a participant with specialized expertise such as a program operations department. Appropriate project management of the test stage can be a requirement for further activities in the development process.

Handover task 1484 is directed to managing the preparation and presentation of the development result to the participants in the next phase of the development process. For example, the development result can be prepared for presentation to participants in the production phase of a development process or the development result can be prepared for presentation to participants in the delivery and acceptance phase of a development process. Preparing and presenting the development result can include documenting any open issues with the development, determining a response to an open issue, assigning participants to address or monitor an open issue, reviewing the completeness of a bill of materials or other list of components of the development result, confirming that the listed components are included in the development result, and scheduling a handover meeting where the development result is delivered and one or more test reports are presented. Handover task 1484 can also include a review of a production validation plan for the development result.

Maintenance handover task 1486 is directed to preparing and presenting the development result and associated documentation to the participants in the maintenance phase. Preparing and presenting the development result can include the preparation of a handover plan that specifies maintenance staff who are to receive the development result, timeframes for delivery of the result, and the required deliverables. Deliverables can include the preparation of support infrastructure and the operating environment, as well as integration of the development result into the operating environment. The presented documentation can include technical documentation (such as an installation guide or an upgrade guide) and non-technical documentation (such as a user guide or training materials). The presented documentation can also include review and training sessions for the maintenance phase.

The handover plan can be specified with a maintenance team manager and with the customer. For example, the maintenance plan can be specified in a statement of work for the development. The handover plan can be specified during a meeting with technical members of the development and maintenance teams.

Test stage sign-off task 1488 is directed to confirming that a customer accepts the tested development. Confirming customer acceptance can include confirming customer acknowledgement of completion of the testing stage, confirming that the customer has read and understood the results of the tests, confirming that the customer is authorized to accept the development result, confirming that the customer authorizes the beginning of the next stage of the development process, and confirming that the customer is authorized to accept the development result.

If customer acceptance is confirmed, then the development process can proceed to the acceptance and delivery phase of the development process. If the customer does not accept the development result, then the result can be adjusted or the development process can be closed out, as appropriate. The project manager can confirm customer agreement to the development result alone or in conjunction with a program operations liaison. The customer's acceptance can be manifested by a signature on a development result approval form. The signed development result approval form can be archived in a central location, along with the corresponding development result, for reference.

Test documentation check-in task 1490 is directed to archiving documentation generated during the test stage of the development process. The test documentation can be archived in a central repository, such as a project lifecycle repository or an information strategy planning system (ISP), for reference. The archive documentation can be used to establish intellectual property rights to the development.

Execution monitoring task 1492 is directed to project management of the delivery and acceptance phase of a development process. Execution monitoring task 1492 differs from execution monitoring task 810 in that execution monitoring task 810 primarily deals with gathering and updating project management information, whereas execution monitoring task 1492 primarily deals with applying the gathered project management information in various project management systems and techniques. For example, project management information can be applied in project cost tracking, a project plan, project scheduling, a change management plan, a risk management plan, issue tracking, status reporting, a communications plan, lessons learned, and individual/team performance reports. Execution monitoring task 1492 can be ongoing throughout the delivery and acceptance phase and execution monitoring task 1492 can be performed by a participant with specialized expertise such as a program operations department. Appropriate project management of the delivery and acceptance phase can be a requirement for further activities in the development process.

Delivery and acceptance phase initiation task 1494 is directed to managing the preparation for the delivery and acceptance phase. This preparation can include a review and modification of existing development documentation, deliverables, participants, and participant roles to ensure readiness for the delivery and acceptance phase. Existing development documentation can include, e.g., a project plan, a risk management plan, a specification, a technical specification, development management documents, and a development agreement.

Preparation for the delivery and acceptance phase can also include preparing the participants in the delivery and acceptance phase, e.g., by presenting the participants and the customer with an overview of the delivery and acceptance phase. The overview can include phase deliverables and target dates.

As mentioned above, cookbooks can include additional information describing tasks in a development process. FIG. 15 shows a cookbook 1500 that describes four tasks 1505, 1510, 1515, 1520 with a responsible entity identifier 1525, an accountable entity identifier 1530, and a resource identifier 1535, along with task identifier 325, one or more objectives 330, one or more inputs 335, and one or more outputs 340. Responsible entity identifier 1525 identifies one or more participants in the development process responsible for performance of the task activities. A responsible entity can be the person, the roll, or the group who is to perform the task activities. Accountable entity identifier 1530 identifies one or more participants in the development process accountable for performance of the task activities. An accountable entity can be the person, the roll, or the group who is liable for nonperformance of the task activities. Resource identifier 1535 identifies one or more sets of instructions, standards, documentation guidelines, and other resources for the performance of the task activities.

Identifiers 1525, 1530, 1535 can be a name or other identification information. For example, resource identifier 1535 can identify a set of instructions or documentation guidelines by a name or a memory location in which the instruction set or documentation guideline set is stored in machine-readable format. Resource identifier 1535 can also identify a set of instructions by including the instructions themselves in cookbook 1500. The identified resource can be a template. Technical Appendix 1 shows example templates for the representation and management of a development process in which the development result is a set of machine-readable instructions for performing operations and the development is requested by an external customer.

Figure 16:
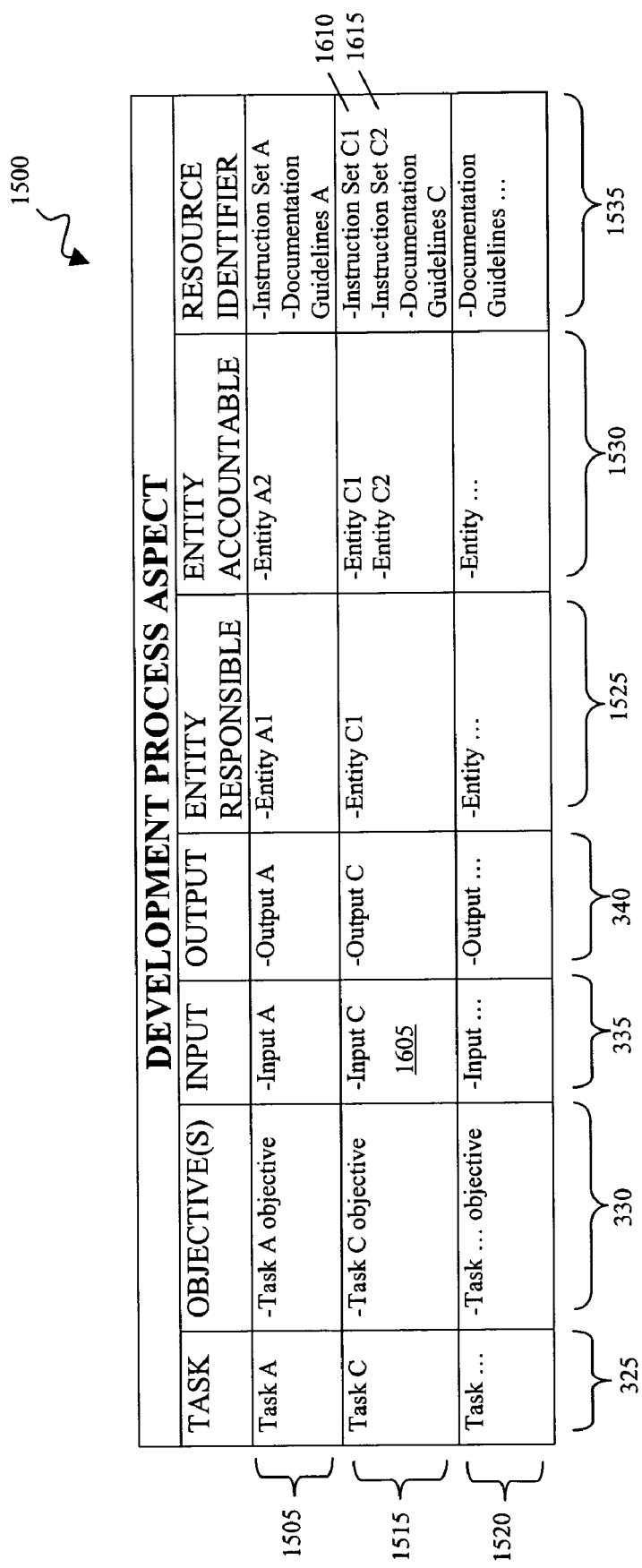
FIG. 16 shows the cookbook of FIG. 15 after deletion of a task description.

Cookbooks can be a superset of task descriptions from which a subset of task descriptions can be selected. The selected subset can be fit to a particular purpose such as a particular development process. FIG. 16 shows cookbook 1500 after a subset of tasks (including tasks 1505, 1515, 1520) has been selected as fit to a particular development process. In particular, task 1510 has been deleted and the position occupied by task 1510 occupied by closing the gap between task 1505 and task 1515. Moreover, the deletion of task 1510 can be accommodated in other ways. For example, task 1515 includes an input 1605, a first set of instructions 1610, and a second set of instructions 1615. Instructions 1610 can include information regarding location of input 1605 when the input 1605 is part of an output of another task activity and instructions 1615 can include information regarding generation of input 1605 in the absence of the other task activity from the development process. If input 1605 were part of the output of deleted task 1510, then an actor can use the information in instructions 1615 to generate input 1605 in the absence of task 1510.

Technical Appendix 1 shows another implementation of a cookbook, along with example templates for managing and representing a software development process; Technical Appendix 1 is hereby incorporated by reference.

The example implementation represented in Technical Appendix 1 is also presented in electronic form with this application on a compact disc (a copy of which is also included with this filing).

The compact disc includes cookbook documents in a directory file entitled "Cookbooks", created Aug. 21, 2003 and being 620,544 bytes (626,688 bytes on disc), template documents in a directory file entitled "Templates", created Aug. 21, 2003 and being 20,579,345 bytes (20,645,888 bytes on disc), and a JPG file entitled "Model" created Aug. 21, 2003 and being 145,598 bytes (147,456 bytes on disc); the contents of this compact disc are hereby incorporated by reference.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., a data server), a middleware component (e.g., an application server), and a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a personal area network ("PAN"), a mobile communication network, and/or the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Aspects of a development process can be denoted differently. Interfaces between aspects can be omitted, increased in number, or otherwise changed. The names of tasks can be changed, and activities can be omitted from or added to tasks. The names of documentation can be changed, and information can be omitted from or added to the described documentation. Depicted tasks can also be omitted from a cookbook, and additional tasks can be added to a cookbook. The depicted tasks do not require the particular order shown, or sequential order, to achieve desirable results. For example, the development result can be produced before or after delivery. As another example, ARC sheet update task 1438 can be omitted when no contributions are made by external individuals. The rolls specified in project plan detailing task 1444 can change iteratively as development progresses. Maintenance activities (such as maintenance planning task 1462) can be omitted if the developed is not legally obligated to maintain the development result. In certain implementations, multitasking and parallel processing may be preferable.

Other embodiments may be within the scope of the following claims.

The invention claimed is:

1. A method for managing a software development process, comprising:
providing a first cookbook describing tasks in a first framework of a collection of frameworks of the development process, where the first framework comprises an evaluation phase in which a request for a proposed development is received and evaluated, the first cookbook providing:
a first collection of task descriptions in a first track of the development process, the first collection directed to development of a result, and where the first collection of task descriptions in the first cookbook identifies:
an activity in the development process,
an input for performance of the activity,
an output consequential of performance of the activity, and
instructions for performance of the activity, and
a second collection of task descriptions in a second track of the development process, the second collection directed to project management of the development of the result;
managing performance of the development process with the first cookbook, including:
assigning activities in the development process to different participants in accordance with the activities identified in the task descriptions, exchanging information between participants in accordance with the inputs and outputs identified in the task descriptions, and instructing the participants in accordance with the instructions identified in the task descriptions; and providing a second cookbook describing tasks in a second framework of the collection of frameworks, where the collection of frameworks comprises:

a development and test phase in which a development result is developed and tested, a delivery and acceptance phase in which the development result is delivered to and accepted by the party who requested development, and a maintenance phase in which the development result is maintained.

2. The method of claim 1, wherein providing the first and second cookbooks describing tasks in the first and second frameworks of the development process comprises providing a regular arrangement of task descriptions in one or more matrices.

3. A method comprising:

receiving a superset of task descriptions describing potential tasks in a development process, the superset of task descriptions organized by tracks in the development process, a first track directed to development of a result, a second track directed to project management of the development of the result, where the superset is further organized by phases in the development process, the phases including:

an evaluation phase wherein a request for a proposed development is received and evaluated, a development and test phase wherein a development result is developed and tested, a delivery and acceptance phase wherein the development result is delivered to and accepted by the party who requested development, and a maintenance phase wherein the development result is maintained;

selecting a relevant set of task descriptions from the superset, the relevant set fit to a particular development process; and arranging the relevant set in a framework for performing the particular development process.

4. A system comprising:

a memory storing a superset of task descriptions describing potential tasks in development processes, the superset of task descriptions organized by tracks in the development process, a first track directed to development of a result, a second track directed to project management of the development of the result, where the development processes include:

an evaluation phase in which a request for a proposed development is received and evaluated;

a development and test phase in which a development result is developed and tested;

a delivery and acceptance phase in which the development result is delivered to and accepted by the party who requested development; and a maintenance phase in which the development result is maintained; and a first task description in the superset identifying:

a first activity in the development process;

a first input for performance of the first activity;

a first output consequential of performance of the first activity;

instructions for performing the first activity; and one or more processors executing at least a portion of the development process.

5. The system of claim 4, wherein the instructions include:

information regarding location of the first input when the first input is part of an output of a second activity in a development process; and information regarding generation of the first input in an absence of the second activity from the development process.

6. The system of claim 4, further comprising a framework for assembly of a relevant set of task descriptions from the superset, the relevant set of task descriptions fit to the development process.

7. The system of claim 6, wherein the framework comprises a matrix for regular arrangement of task descriptions in rows and columns.

8. The system of claim 4, further comprising a selection mechanism to select a relevant set of task descriptions from the superset, the relevant set of task descriptions fit to the development process.

9. The system of claim 4, wherein the superset of task descriptions includes at least forty-two task descriptions selected from a collection of tasks including:

a lead generation task;
a lead qualification task;
an evaluation task;
a negotiation task;
a specification creation task;
a specification review task;
an intermediate design task;
a prototype creation task;
a design review task;
a test strategy definition task;
a test strategy review task;
a specification stage sign-off task;
a test and development guide update task;
a monitor development execution task;
a create scenario design/component architecture task;
a review scenario design/component architecture task;
a create scenario documentation task;
a component design task;
a review component design task;
a monitor development execution task;
a kickoff implementation task;
a test catalogue creation task;
an implementation task;
a test catalogue review task;
a test readiness confirmation task;
a development testing task;
a supplemental testing task;
a result freeze task;
a module integration testing task;
a technical specification creation task;
a technical specification review task;
a test systems and tester preparation task;
a user documentation task;
a component assembly task;
a master guide checklist update task;
a test readiness confirmation task;
a development result to test transfer task;
an execution monitoring task;
an acceptance test kick-off task;
an error correction task;
an acceptance testing task;
a result documentation review task;
an emergency correction task;
a test report creation task;

a handover task;
a delivery and acceptance phase initiation task;
an execution monitoring task;
a handover receipt task;
a development result distribution task;
a development result distribution validation task;
a sign-off task;
a warranty obligation fulfillment task;
a sales/marketing material creation task;
a scenario validation task;
a maintenance handover task;
a maintenance sign-off task;
a transition to maintenance task;
a phase close-out task;
a development performance reporting task;
a development process analysis task;
a participant debriefing task;
a document check-in task;
a close-out checklist completion task;
a close-out checklist review task;
a handover (development and testing to production and assembly) task;
a prototype assembly task;
a prototype validation in reference environment task;
a prototype validation in different environment(s) task;
an installation guide creation task;
an assembly/validation status reporting task;
a project management task;
a development result production task;
a prototype validation reporting task;
a handover (production and assembly to customers and maintenance) task;
a maintenance scheme establishment task;
a monitoring and dispatch task;
a problem analysis task;
a maintenance activity performance task;
a maintenance activity testing task;
a maintenance information propagation task;
a maintenance instruction generation task;
a maintenance event termination task;
a maintenance reporting task;
a development request evaluation task; and
a correction propagation task.

10. The system of claim 9, wherein the superset of task descriptions includes at least sixty tasks selected from the collection.

11. The system of claim 10, wherein superset of task descriptions includes at least seventy tasks selected from the collection.

12. The system of claim 9, wherein the descriptions of the lead generation task, the lead qualification task, the evaluation task, and the negotiation task comprise at least fourteen task descriptions selected from a second collection of tasks including:
a lead targeting and gathering task;
a lead qualification task;
a project/service request handover task;
a project/service request approval task;
an information gathering task;
an opportunity development task;
an opportunity assessment task;
a staffing/project prioritization pre-clarification task;
a project/service request approval task;
an evaluation offer presentation task;
an evaluation offer negotiation task;
a project charter and business case project team establishment task;
a customer business model and business process(es) analysis task;
a product strategy definition task;
a solution proposal creation task;
an ARC sheet creation task;
a solution proposal review task;
a business case creation task;
a risk analysis task;
a business case review task;
a business case approval and sign-off task;
a service/project proposal creation task;
a service/project proposal negotiation task;
a handover to development task;
a license and service agreement check task;
a framework agreement negotiation task;
a statement of work negotiation task; and
a contract execution and filing task.

13. The system of claim 12, wherein the lead generation task description, the lead qualification task description, the evaluation task description, and the negotiation task description include at least twenty tasks selected from the second collection.

14. The system of claim 13, wherein the lead generation task description, the lead qualification task description, the evaluation task description, and the negotiation task description include at least twenty-five tasks selected from the second collection.

15. A method comprising:
providing one or more matrices describing tasks that define a phased project development methodology to be used in a development process, wherein a first of the tasks receives output information from a second of the tasks when the second of the tasks is retained in the development process, the first task providing a description regarding obtaining the output information when the second task is disregarded in the development process, and where the phased project development methodology includes:
an evaluation phase in which a request for a proposed development is received and evaluated,
a development and test phase in which a development result is developed and tested,
a delivery and acceptance phase in which the development result is delivered to and accepted by the party who requested development, and
a maintenance phase in which the development result is maintained; and
wherein the one or more matrix task descriptions are organized by tracks in the development process, a first track directed to development of a result, a second track directed to project management of the development of the result.

16. The method of claim 15, wherein the one or more matrices describe tasks by identifying:
an activity in the development process;
an input corresponding to performance of a second activity in the development process;
an output consequential of performance of the activity; and
a link to a corresponding template for performance of the activity.

17. The method of claim 15, further comprising:
selecting one or more of the tasks in the one or more matrices;
generating a phased software product development methodology using a set of the templates corresponding to the selected tasks; and managing a software development process using the generated software product development methodology.

18. A computer program product for managing a software development process, tangibly embodied in a machine-readable, physical storage device, comprising instructions operable to cause a programmable processor to:

provide a first cookbook describing tasks in a first framework of a collection of frameworks of the development process, where the first framework comprises an evaluation phase in which a request for a proposed development is received and evaluated, the first cookbook providing:

a first collection of task descriptions in a first track of the development process, the first collection directed to development of a result, and where the first collection of task descriptions in the first cookbook identifies:
an activity in the development process,
an input for performance of the activity,
an output consequential of performance of the activity, and
instructions for performance of the activity, and a second collection of task descriptions in a second track of the development process, the second collection directed to project management of the development of the result;

manage performance of the development process with the first cookbook, including:

assigning activities in the development process to different participants in accordance with the activities identified in the task descriptions, exchanging information between participants in accordance with the inputs and outputs identified in the task descriptions, and instructing the participants in accordance with the instructions identified in the task descriptions; and provide a second cookbook describing tasks in a second framework of the collection of frameworks, where the collection of frameworks comprises:

a development and test phase in which a development result is developed and tested, a delivery and acceptance phase in which the development result is delivered to and accepted by the party who requested development, and a maintenance phase in which the development result is maintained.

* * * * *